US011704692B2

(12) United States Patent
Kendall et al.

(10) Patent No.: US 11,704,692 B2
(45) Date of Patent: Jul. 18, 2023

(54) PROMOTING REPRESENTATIONS OF ITEMS TO USERS ON BEHALF OF SELLERS OF THOSE ITEMS

(71) Applicant: Pinterest, Inc., San Francisco, CA (US)

(72) Inventors: Timothy Alan Kendall, San Mateo, CA (US); Francis Joseph Fumarola, Menlo Park, CA (US); Nipoon Malhotra, Mountain View, CA (US)

(73) Assignee: Pinterest, Inc., San Francisco, CA (US)

( * ) Notice: Subject to any disclaimer, the term of this patent is extended or adjusted under 35 U.S.C. 154(b) by 378 days.

(21) Appl. No.: 15/153,400

(22) Filed: May 12, 2016

(65) Prior Publication Data

US 2017/0330232 A1 Nov. 16, 2017

(51) Int. Cl.
*G06Q 30/02* (2023.01)
*G06Q 30/0251* (2023.01)
*G06Q 30/0601* (2023.01)

(52) U.S. Cl.
CPC ..... *G06Q 30/0255* (2013.01); *G06Q 30/0643* (2013.01)

(58) Field of Classification Search
CPC .................. G06Q 30/0255; G06Q 30/0643
See application file for complete search history.

(56) References Cited

U.S. PATENT DOCUMENTS

| | | | |
|---|---|---|---|
| 5,579,471 A | 11/1996 | Barber et al. | |
| 5,596,690 A | 1/1997 | Stone et al. | |
| 6,446,081 B1 | 9/2002 | Preston | |
| 7,117,519 B1 | 10/2006 | Anderson et al. | |
| 8,429,168 B1 | 4/2013 | Chechik et al. | |
| 8,909,563 B1 | 12/2014 | Jing et al. | |
| 9,098,741 B1 | 8/2015 | Anguelov et al. | |
| 10,325,285 B1* | 6/2019 | Wai | G06Q 30/0255 |
| 2004/0013286 A1 | 1/2004 | Viola et al. | |
| 2005/0031165 A1 | 2/2005 | Olson et al. | |
| 2005/0225678 A1 | 10/2005 | Zisserman et al. | |
| 2006/0018521 A1 | 1/2006 | Avidan | |

(Continued)

FOREIGN PATENT DOCUMENTS

CA 2495046 A1 2/2004
JP 2010250426 A1 11/2010

OTHER PUBLICATIONS

Hsiao et al., On visual similarity based interactive product recommendation for online shopping, 2014, 2014 IEEE International Conference on Image Processing (ICIP), pp. 3038-3041 (Year: 2014).*

(Continued)

*Primary Examiner* — John Van Bramer
(74) *Attorney, Agent, or Firm* — Athorus, PLLC

(57) ABSTRACT

This disclosure describes systems and methods for establishing promotions for sellers and promoting images of items to users on behalf of sellers. A management service receives a source location identifier from a seller, processes images stored in an image data store to determine images that include the source location identifier in the corresponding image information and includes those images in a promotion that is established for the seller. Likewise, the management service may determine users that have previously interacted with the images and include those users in the promotion campaign.

22 Claims, 17 Drawing Sheets

(56) References Cited

U.S. PATENT DOCUMENTS

| | | |
|---|---|---|
| 2006/0112092 A1 | 5/2006 | Ziou et al. |
| 2006/0251292 A1 | 11/2006 | Gokturk et al. |
| 2007/0071323 A1 | 3/2007 | Kontsevich et al. |
| 2007/0177805 A1 | 8/2007 | Gallagher |
| 2007/0286531 A1 | 12/2007 | Fu et al. |
| 2010/0082597 A1 | 4/2010 | Retterath et al. |
| 2010/0106732 A1 | 4/2010 | Atallah et al. |
| 2010/0205142 A1 | 8/2010 | Feulner et al. |
| 2010/0226564 A1 | 9/2010 | Marchesotti et al. |
| 2011/0081090 A1 | 4/2011 | Bouguet et al. |
| 2011/0194761 A1 | 8/2011 | Wang et al. |
| 2011/0268323 A1 | 11/2011 | Gallagher |
| 2011/0276406 A1* | 11/2011 | Sneyders ............... G06Q 30/02 705/26.1 |
| 2011/0320317 A1* | 12/2011 | Yuan ................ G06Q 30/0603 705/26.61 |
| 2012/0123976 A1 | 5/2012 | Wang et al. |
| 2012/0194681 A1 | 8/2012 | Atsmon et al. |
| 2012/0290447 A1* | 11/2012 | Hershenson ....... G06Q 30/0277 705/27.2 |
| 2012/0294520 A1 | 11/2012 | Mei et al. |
| 2013/0007620 A1 | 1/2013 | Barsook et al. |
| 2013/0132236 A1 | 5/2013 | Gokturk et al. |
| 2013/0188886 A1 | 7/2013 | Petrou et al. |
| 2013/0282712 A1 | 10/2013 | Brandt |
| 2014/0029854 A1* | 1/2014 | Lyons ..................... G06F 16/58 382/209 |
| 2015/0112774 A1* | 4/2015 | Georgoff ............ G06Q 30/0273 705/14.1 |
| 2015/0134688 A1 | 5/2015 | Jing et al. |
| 2015/0178317 A1 | 6/2015 | Spielberg |
| 2015/0248429 A1 | 9/2015 | Pregueiro et al. |
| 2016/0005171 A1 | 1/2016 | Watanabe et al. |
| 2016/0027088 A1* | 1/2016 | Jensen ............... G06Q 30/0631 705/26.7 |

OTHER PUBLICATIONS

Extended European Search Report for EP Application No. 14863014.8 dated Mar. 30, 2017.

International Search Report and Written Opinion for PCT Application No. PCT/US2016/031914 dated Aug. 16, 2016.

International Search Report and Written Opinion for PCT Application No. PCT/US2016/055212 dated Dec. 23, 2016.

International Search Report for PCT Application No. PCT/US2014/064871, dated Feb. 6, 2015.

\* cited by examiner

PROMOTING REPRESENTATIONS OF ITEMS TO USERS ON BEHALF OF SELLERS OF THOSE ITEMS

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Sellers in the e-commerce market typically establish a website that may be visited by users to browse various web pages within the website that include product information relating to products offered for sale by the seller. A user may typically obtain product details, product reviews posted by other users, and/or purchase the item from the seller of the product. Upon purchase of the product, the seller will package and ship the item to a user specified delivery destination.

BRIEF DESCRIPTION OF THE DRAWINGS

The detailed description is set forth with reference to the accompanying figures. In the figures, the left-most digit(s) of a reference number identifies the figure in which the reference number appears.

Figure 1:
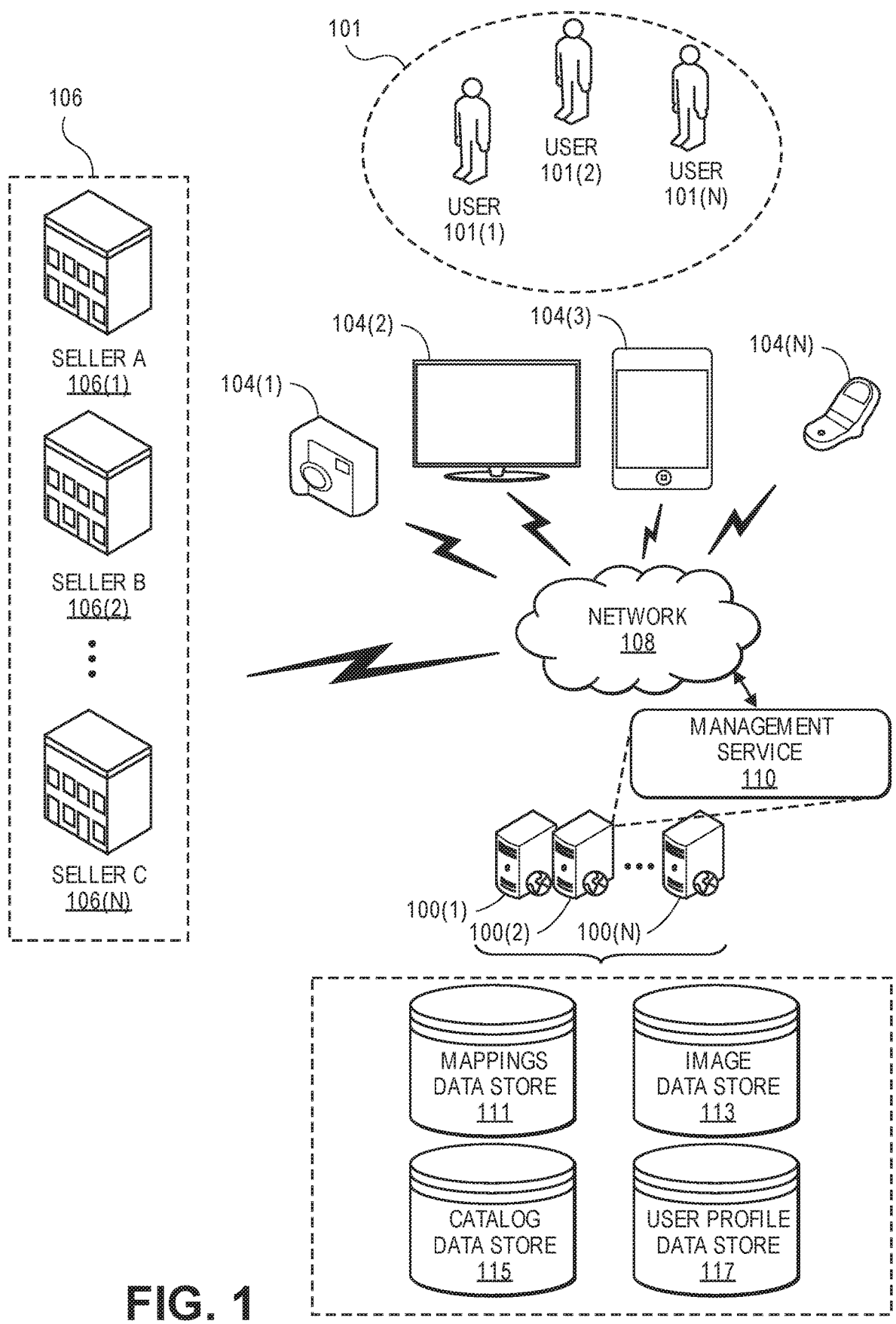
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and methods for matching user provided images that include representations of items with sellers of those items. In addition, described are systems and methods for establishing promotion campaigns for sellers or promotors of items and sending promotions to users on behalf of the sellers or promotors.

A management service, as described herein, may provide a web site where users can post images, view images, share images, correspond with other users, etc. In the implementations described herein, the management service may identify items represented in the images and determine one or more sellers that offer those items for sale. For example, a seller of items may provide an item catalog to the management service that identifies items offered for sale by the seller that may be purchased by users from the seller. The item catalog may identify the item, a source location identifier, such as Uniform Resource Locator ("URL") of a web page of the seller's website from which the item may be viewed and/or purchased from the seller, an image of the item, item information, image information, etc.

The management service may use the information from the item catalog provided by the seller to determine if any of the images accessible by users of the management service include representations of items offered for sale by the seller. For example, in some instances, users of the management service may post an image to the management service that was obtained from another web page, such as a web page of the seller's website. In such an instance, the posted image may include image information, also known as metadata, which includes the source location identifier (e.g., URL) from which the image was obtained. If the source location identifier of the image provided by the user corresponds with a source location identifier included in the item catalog, it may be determined that the image provided by the user to the management service includes a representation of an item available for purchase from the seller and the user provided image is associated with the item and/or the seller of the item.

In another example, if the image provided by the user does not include a source location identifier, or the source location identifier included in the image information does not correspond with a source location identifier from the item catalog, the image may be processed using one or more image processing algorithms to detect an item represented in the image. The processed image may then be compared with images and/or image information included in the item catalog provided by the seller to determine if an item offered for sale by the seller is represented in the image. If it is determined that an item offered for sale by the seller is represented in the image provided by the user, the user provided image is associated with the item and/or the seller of the item. Likewise, the source location identifier of the seller may be added to the image information associated with the image.

When the user or another user of the management service requests to view the user provided image that has been determined to include a representation of an item offered for sale by the seller, a purchase control is presented with the user provided image. In addition, seller information that identifies the seller and/or the item may likewise be presented with the presentation of the user provided image. The purchase control is selectable by the user viewing the image to obtain variant information about the item represented in the image and/or to purchase the item represented in the image from the seller. Item "variant information," as used herein, is additional information about the item and/or the sale of the item. For example, item variant information may include the quantity of the item available for sale by the seller, the price of the item, a size of the item, a color of the item, a shipping cost for shipping the item, a shipping time, and/or other information.

If a user requests to purchase an item represented in a user provided image from a seller that has been determined to offer the represented item for sale, the management service facilitates the purchase between the user and the seller. For example, the management service may provide an item identifier, item information (e.g., selected variants), user identifier, etc. In some implementations, the management service may likewise facilitate payment by the user for the item, such as through a third party payment processor. Alternatively, payment information may be provided to the seller for processing of payment for the item. Finally, purchase of the item is completed and the seller may ship the item to the user.

An "item" may be anything that can be represented and offered for sale. For example, an item may be a physical good (clothing, hardware, paintings, etc.), a digital item (e.g., audio, video, image), a service (e.g., landscaping, banking, house painting).

In some implementations, a seller may interact with the management service and establish promotion campaigns in which representations of items offered for sale by the seller are promoted to users of the management service. In contrast to traditional advertising campaigns, the seller only need provide a source location identifier. The management service may then identify all images that include the source location identifier in the image information and include those images in the promotion campaign. Likewise, the management service may identify users of the management service to which the images are to be sent as promotions on behalf of the seller. For example, the management service may determine users that have previously interacted with the images and target the promotion campaign toward those users.

FIG. 1 is a pictorial diagram of an illustrative environment that includes users 101, such as users 101(1), 101(2)-101(N), a server system 100 that includes one or more server computers 100(1), 100(2)-100(N), one or more client devices 104, such as client device 104(1), 104(2), 104(3)-104(N), and one or more sellers 106, such as a Seller A 106(1), Seller B 106(2)-Seller C 106(N) communicatively connected via a network 108. As will be appreciated, any number and/or type of server systems 100, client devices 104 and/or sellers 106 may be included in the environment, and those illustrated in FIG. 1 are only exemplary. Likewise, any number of users 101 may be included in the environment. For purposes of this discussion, the term "user" will be used herein to refer to an individual interacting with the management service 110 (discussed below) to post or otherwise provide images, view images, share images, correspond with other users, purchase items represented in images, etc.

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 100 may also include a mappings data store 111, an image data store 113, an item catalog data store 115, and/or a user profile data store 117. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 111, image data store 113, item catalog data store 115, and user profile data store 117 may be integrated with the server system 100 or otherwise communicatively coupled with the server system 100. For example, one or more of the mappings data store 111, image data store 113, item catalog data store 115, and/or user profile data store 117 may be located at a remote computing resource (not shown) and communicatively coupled with the server system 100. In some implementations, the mappings data store 111, image data store 113, item catalog data store 115, and/or user profile data store 117 may include one or more CD-RW/DVD-RW drives, hard disk drives, tape drives, or other storage devices that are utilized to store digital content and information. The server system 100, separately or together with the mappings data store 111, image data store 113, item catalog data store 115, and/or user profile data store 117, may provide a management service 110 that facilitates user 101 postings of images, viewing of images, sharing of images, promotion of images, corresponding with other users, viewing of item variant information for items represented in images, and the like. Likewise, the management service 110 may facilitate promotion campaigns and/or the purchase by a user of an item represented in an image from a determined seller of the item.

The server system 100 may also be configured to exchange information with one or more sellers 106. The sellers 106 may include any type of entity and/or individual(s) that offers items for sale. For example, sellers 106 may include e-commerce websites that sells and delivers items, a service offering, a traditional retail or wholesale store, etc.

In some implementations, the sellers 106 may interact with the management service 110 and provide and/or update an item catalog listing items offered for sale by the seller. Likewise, sellers 106 may interact with the management service 110 to provide promotional information that is used by the management service to establish a promotion on behalf of the seller.

The item catalog may include item information about each item offered for sale by the seller. For example, the item information may include a name of the item, a price of the item, a source location identifier (e.g., URL) for the seller's web page from which the item may be viewed and/or purchased from the seller, a geographic location of the seller, an advertising amount the seller is willing to pay to advertise the item and/or have a user provided image associated with the item, etc. For example, a seller may offer for sale thousands of items via their own e-commerce website and each of those items may be associated with or represented on one or more web pages of the seller's website. The seller 106 may provide to the management service 110 an item catalog listing one, some, or all of the items that the seller offers for sale. As discussed further below, the management service 110 may store the seller provided item catalog in the item catalog data store 115 and determine if any images, such as user provided images, maintained in the image data store 113 include a representation of an item listed in the item catalog provided by the seller. Images maintained in the image data store 113 that include a representation of an item identified by the seller in the item catalog are associated with the item and/or the seller. The association is maintained in the mappings data store 111.

Sellers 106 may also periodically update the provided item catalog by identifying additional items that the seller offers for sale, removing items from the item catalog, and/or by providing updated variant information for items identified in the item catalog. Those updates are reflected in the item catalog data store 115 and may be used by the management service 110 when presenting images to users.

In some implementations, the seller may also provide promotion information, which may include a source location identifier and, optionally, other promotion related information. Other promotion related information may include an amount the seller is willing to pay to promote an item or image represented in an item, a desired impression count for images, a duration of a promotion, user characteristics or types to target for the campaign, types of devices to which promotion information is to be sent, etc. As discussed further below, the management service may utilize the promotion information to establish a promotion on behalf of the seller and to promote items and/or images of items to users of the service on behalf of the seller.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, wearable devices, set-top-boxes, game consoles, cameras, audio recorders/players, or any combination thereof. As will be described with regard to the implementations shown herein, the server system 100 is configured to exchange data and information, including information about users, images, sellers, items, item variants, and other like information with client devices 104. For example, the management service 110 may interact via the server system 100 to present images to a user 101, present item variant information to a user 101, facilitate purchase of an item between a user and a seller of the item, and the like.

Likewise, a user 101 may interact with the management service 110, via a client device 104, to provide images, view images, share images, correspond with other users, initiate a purchase of an item from a seller of the item, etc. As described herein, a user that provides an image that includes a representation of an item is a different person or entity that is determined to be a seller of the item represented in the image. A seller may likewise provide images of items offered for sale by the seller.

The mappings data store 111 stores information about the associations between items represented in user provided images and items offered for sale by sellers. For example, an item may be determined to be represented in a user provided image that is available for sale (listed in an item catalog) from three different sellers. In such an example, the mappings data store 111 will maintain an association between the user provided image, which is maintained in the image data store 113, and the corresponding item listed in each of the seller's provided item catalogs.

The user profile data store 117 stores information about users 101 of the management service 110. Any type of information may be stored in the user profile data store 117. For example, user profile information, such as attributes, name, address, gender, browse history, purchase history, billing information, shipping information, purchasing information, social networks and/or friends with which the user 101 interacts, and the like, may be stored in the user profile data store 117. For example, browse information for a user may indicate each image viewed or requested by the user, a frequency of image views, a duration of time a user viewed an image, whether the user posted, forwarded, or otherwise shared the image, etc.

User profile information may be provided directly by users 101 and/or collected from users 101 of the client devices 104 when interacting with the management service 110 (e.g., clickstream data as the user explores the management service 110), when posting, viewing, and/or sharing images, when facilitating a purchase between the user and a seller, etc. In some implementations, users of the management service 110 may choose to limit the amount of information included in their user profile, to limit access to their user profile information and/or to limit what information is shared, if any, from their user profile information. The user profile information maintained in the user profile data store 117 may be used by the management service 110 to facilitate a purchase of an item by a user from a seller.

In addition to maintaining information about mappings, item catalogs, images, and users, the management service 110 may provide use information back to the users 101 and/or the sellers 106. For example, the management service 110, through communication between the server system 100 and a client device 104, may provide use and/or purchase information (e.g., purchase history) back to a user 101. Such information may include an identification of images recently viewed, provided or shared, an identification of others that have viewed images posted by the user, purchases of items made by the user, and the like. Likewise, the management service 110, through communication between the server system 100 and the sellers 106, may provide information to the sellers 106. Such information may include analytics about items offered for sale by the seller, such as how many user provided images include a representation of each item, purchase history for items, etc.

Figure 2:
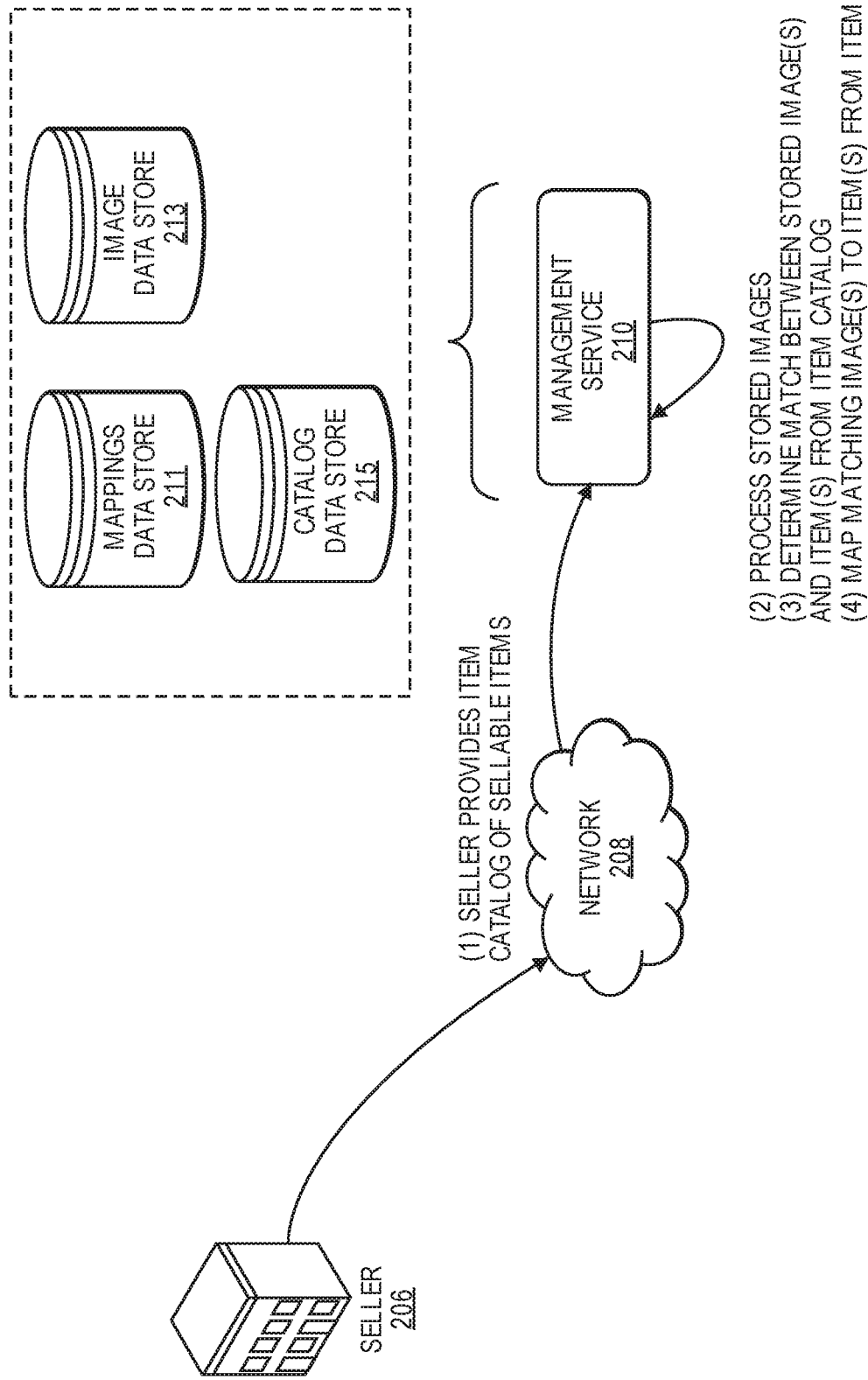
FIGS. 2-3 are block diagrams of an example implementation for matching a seller of an item with a user provided representation of the item, according to an implementation.
Figure 3:
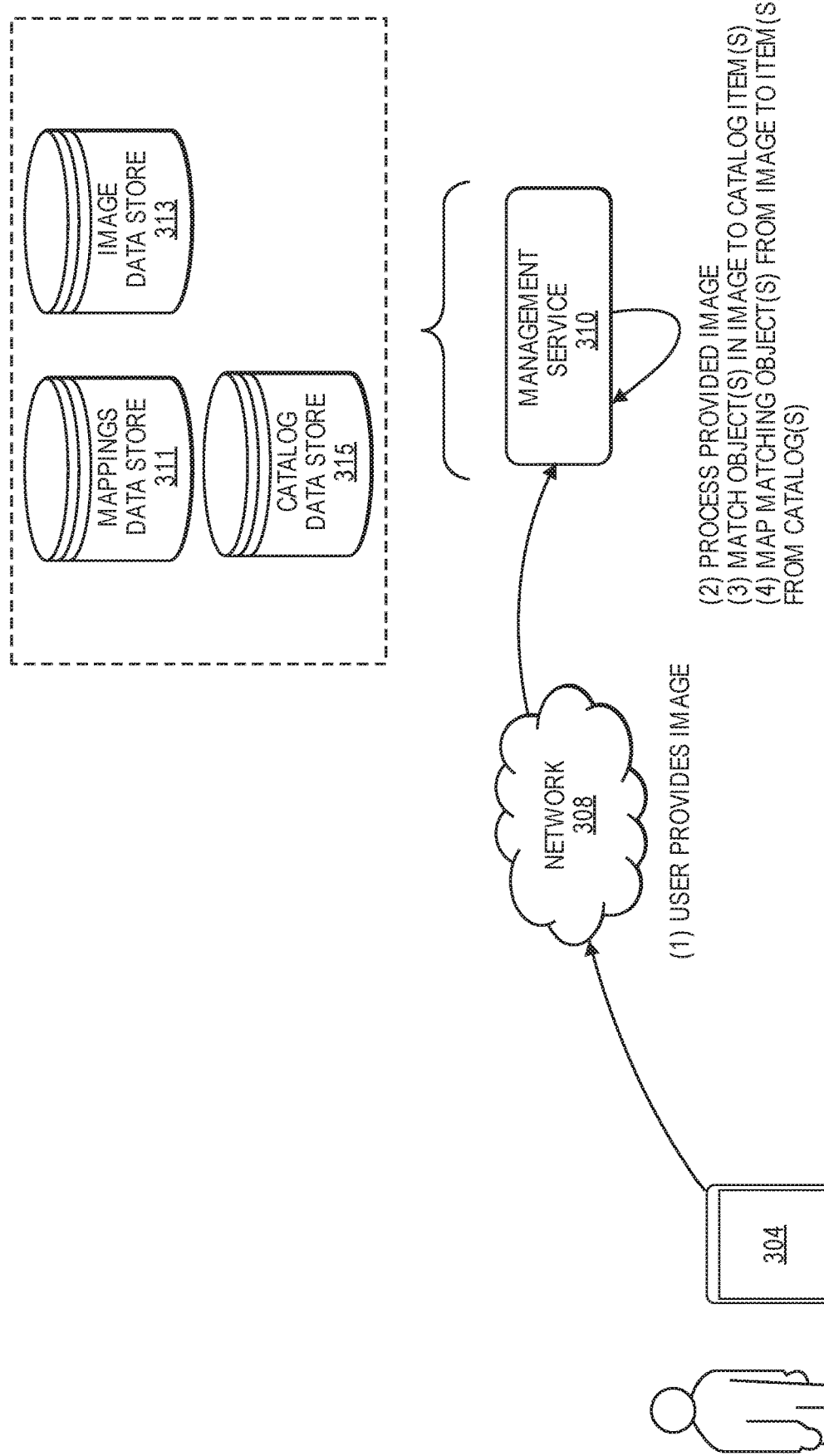

FIGS. 2-3 are block diagrams of an example implementation for matching a seller 206 of an item with a user provided representation of the item, according to an implementation. The example implementation begins with a seller 206 providing an item catalog that identifies one or more items offered for sale by the seller 206. The item catalog is delivered over the network 208 to the management service 210 and the management service 210 stores the item catalog in an item catalog data store 215. The management service 210, upon receiving an item catalog from the seller 206, processes user provided images that are stored in the image data store 213, referred to as stored images, to determine if any of the stored images include a representation of an item identified in the item catalog as an item offered for sale by the user.

Processing of the stored images may be incrementally performed. For example, an initial processing may include comparing a source location identifier, such as a URL, listed in the item catalog for an item, with source location identifier included in the image information of the stored images to determine if any of the source location identifiers are the same or similar. For example, if the source location identifiers are URLs, it may be determined that a source location identifier of an existing image is the same as a source location identifier listed in the item catalog if the two URLs are the same. Likewise, it may be determined that a source location identifier of a stored image is similar to a source location identifier listed in the item catalog if the two URLs have a same domain address (are from the same website or domain).

If the source location identifiers are the same, it may be determined that the stored image includes a representation of an item offered for sale by the seller. If the stored image includes a source location identifier that is similar to that of a source location identifier included in the item catalog, the stored image may also be processed using one or more image processing algorithms to determine if the stored image is similar to the image or image information included in the item catalog that corresponds with the similar source location identifier. For example, a hash value may be determined for the stored image and compared to a hash value included in the item catalog. Alternatively, one or more image processing algorithms, such as an edge detection algorithm, object detection algorithm, etc., may be utilized to determine features of the stored image, which may be represented as feature vectors. Images provided with the item catalog may likewise be processed to generate feature vectors (or feature vectors may be provided with the item catalog). The feature vectors of a stored image may then be compared with feature vectors for the item(s) identified in the item catalog with the similar source location identifier and, if the feature vectors are similar, it may be determined that the stored image includes a representation of an item offered for sale by the seller. In some implementations, the additional processing of the images may likewise be performed for images with a same source location identifier.

A source location identifier may be any location, physical or virtual, that is associated with an item and/or any other identifier that can be used to identify the item. For example, as discussed above, a source location identifier may be URL of a webpage at which information relating to the item may be obtained. In another implementation, the source location identifier may include physical coordinates of one or more physical locations (e.g., physical stores of the seller) where the item may be viewed and/or purchased. In such an implementation, a user provided image may include location information, such as global positioning system (GPS) coordinates, that are compared with the coordinates included in the item catalog. In still other implementations, the source location identifier may include a universal product code (UPC), barcode, bokode, etc. that is associated with the item.

In some implementations, stored images that are not matched to an item of the item catalog as part of the initial processing may be further processed. For example, using the feature vectors for the processed stored image, it may be determined if an item is represented in the image and, if so, a category for the item may be determined. For example, the management service may maintain a list of item categories and corresponding feature vectors that are representative of items associated with the item category. Item categories may be any type of classification or categorization of items. For example, item categories may include shoes, shirts, bags, sporting equipment, clothing, hats, cars, etc. For each item category, feature vectors, colors, shapes, and/or other characteristics of items associated with that category are maintained and may be used to compare with feature vectors and/or other information of the stored image. If there is a similarity between the feature vectors and/or other information associated with the item category and the feature vectors and/or other information of the stored image, the stored image may be associated with that item category.

Likewise, the seller and/or items identified in the item catalog as offered for sale by the seller may also be associated with an item category. Associating items identified by a seller as associated with a category may be done in a similar manner to that discussed above with respect to associating a stored image with a category. Alternatively, or in addition thereto, the seller may identify the category for the item, for example, by identifying an item category for each item listed in the item catalog.

Based on the category determined for the stored image and the categories associated with the sellers 206 and/or items offered for sale by sellers, it is determined whether the stored image potentially includes a representation of an item listed in the provided item catalog. For example, if the item category determined for the stored image corresponds to an item category associated with the seller and/or the item catalog provided by the seller, it may be determined that the stored image potentially includes a representation of an item offered for sale by the seller. If the stored image does include a representation of an item that may be listed in the item catalog, additional processing may be performed to determine the item represented in the image. The additional processing may include additional analysis of the stored image and/or comparison of the feature vectors and/or other image information between the stored image and items of the item catalog associated with the same item category. In another example, the stored image may be manually reviewed by a human and compared to items listed in the item catalog having the same item category to determine if the item represented in the image corresponds to an item listed in the item catalog. The human may be an employee of the management service 210, an independent reviewer, a user (or group of users) of the management service 210, a representative or employee of the seller 206, etc.

If it is determined that a stored image includes a representation of an item listed in the item catalog provided by a seller 206, the management service establishes an association between the item listed in the item catalog and the stored image and stores the association in the mappings data store 211. Likewise, the management service may establish an association between the stored image and the seller 206 and maintain that association in the mappings data store 211. As discussed further below, when a user requests to view a stored image, the management service 210 determines the association between the stored image and the item offered for sale by the seller and presents seller information and/or a purchase control with the presentation of the item.

Turning now to FIG. 3, a user 301 may also provide an image that may be matched with an item offered for sale by a seller. In this example, the user 301, using a client device 304, provides an image to the management service 310 via the network 308. The management service, upon receiving the image stores the image in the image data store 313, processes the provided image, and compares the processed image with the items identified in the item catalog data store 315 to determine if the user provided image includes a representation of an item offered for sale by a seller. Processing of the user provided image may be performed in a similar incremental manner as that discussed above with respect to FIG. 2. For example, a source location identifier of the user provided image may be compared with source location identifiers maintained in the item catalog data store 315, the user provided image may be processed to generate feature vectors that are compared with feature vectors for items identified in the item catalog data store 315, image information associated with the user provided image may be compared with image information from the item catalog data store 315, etc.

If the user provided image is determined to include a representation of an item listed in the item catalog data store 315, the user provided image is associated with the item and/or the seller that offers the item for sale and the association is stored in the mappings data store.

Figure 4:
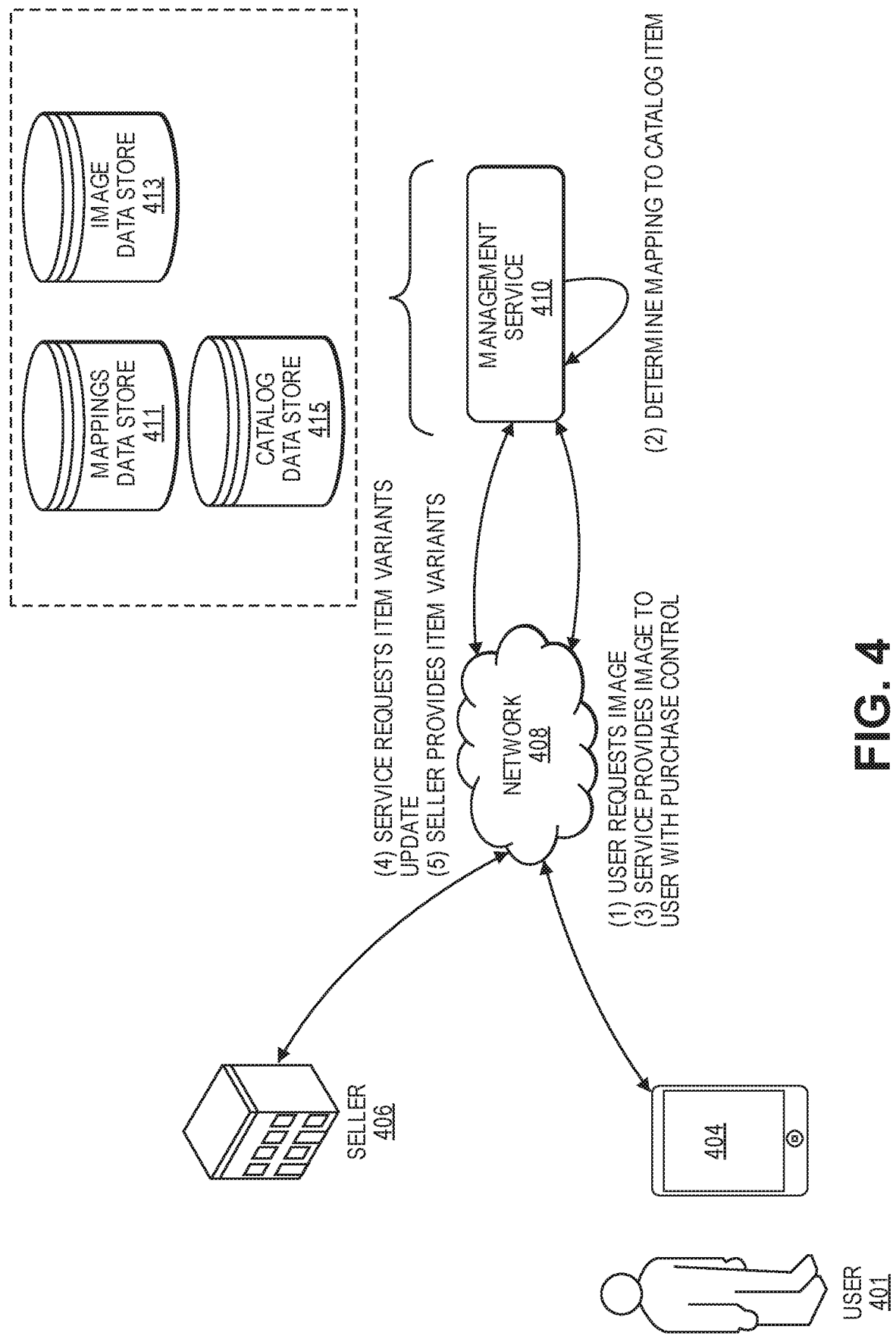
FIGS. 4-5 are block diagrams of an example implementation of facilitating a purchase of a represented item by a user, according to an implementation.
Figure 5:
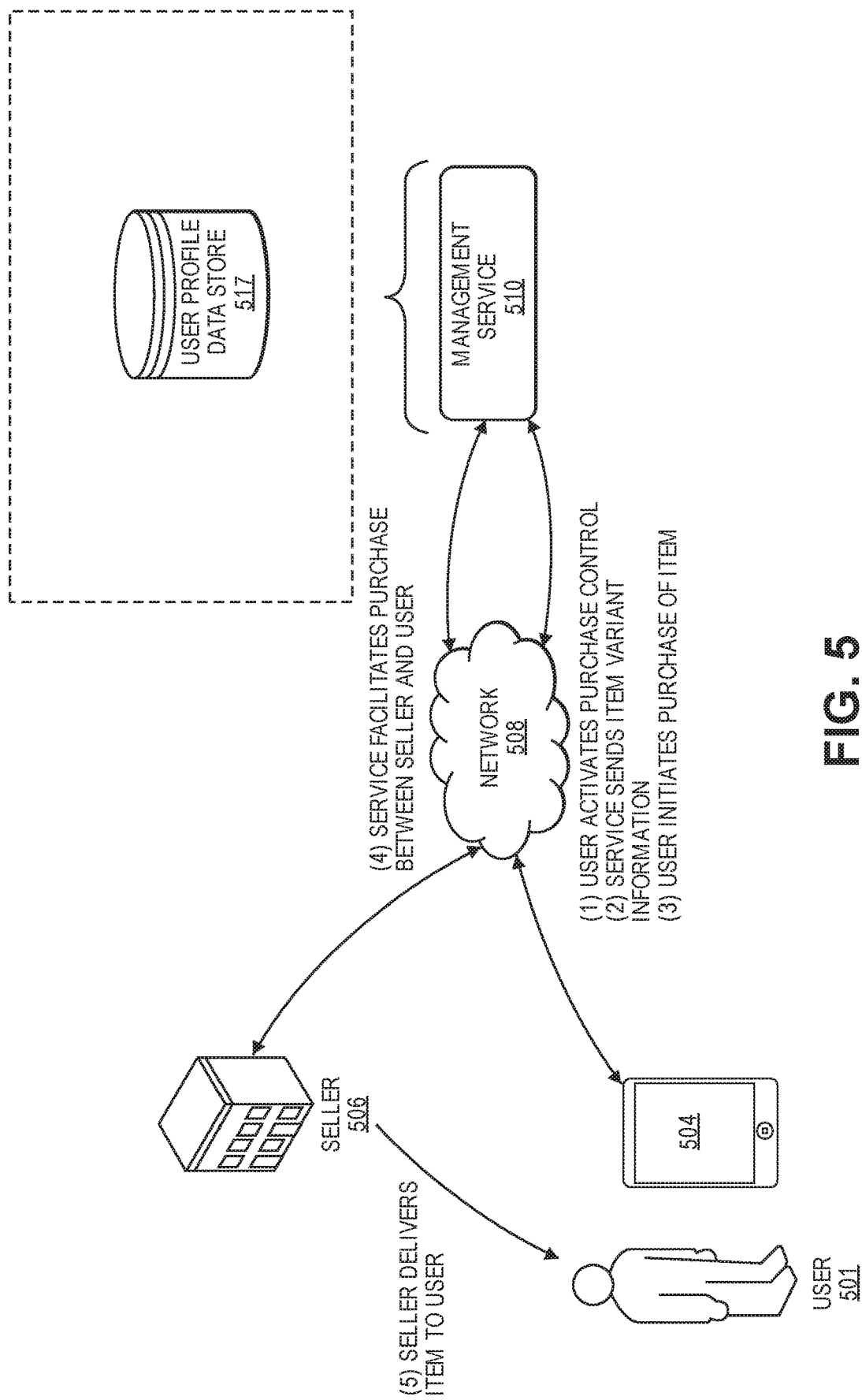

FIGS. 4-5 are block diagrams of an example implementation of facilitating a purchase of a represented item by a user, according to an implementation. Turning first to FIG. 4, the example implementation begins with a user 401 requesting, through a client device 404, to view an image that was provided by a user (the user 401 or any other user) to the management service 410 and stored in the image data store 413. The request is sent from the client device 404 to the management service 410 through a network 408. The management service 410, upon receiving the user's request, queries the mappings data store 411 to determine any associations between the requested image and items offered for sale by a seller. If an association exists between the image requested by the user and an item offered for sale by a seller, as identified in the item catalog data store 415, the management service 410 provides the requested image and a purchase control that is presented to the user. As discussed further below, the purchase control is selectable by the user to obtain additional details about the item represented in the requested image and/or to initiate a purchase of the item from a seller that offers the item for sale. In some implementations, the management service 410 may also provide seller information identifying the seller of the item represented in the image.

In addition to providing the image and purchase control for presentation to the user 401, the management service 410 may also send a request to the seller 406 for item variants related to the item represented in the image that is available for purchase from the seller 406. The seller 406, in response to receiving the request for item variants, may provide the current item variants for the item represented in the image that is available for purchase from the seller 406. In other implementations, rather than, or in addition to the management service 410 sending a request to the seller 406, the seller 406 may periodically send item variant update information to the management service 410. For example, sellers 406 may specify update intervals (e.g., every hour, every day, weekly) and send item catalog and/or item variant updates to the management service that are maintained and used by the management service 410. In some implementations, the sellers 406 may be configured to send item variant updates to the management service 410 when an item variant changes (e.g., price changes, quantity available changes). In such implementations, rather than the management service 410 sending a request to the seller 406 for item variant information, the management service 410 may utilize the previously provided and stored item variant information for the item represented in the requested image.

Turning now to FIG. 5, if a user 501 selects or otherwise activates the purchase control that was provided with the image, the request is sent to the management service 510. For example, the requested image and corresponding purchase control may be sent by the management service 510 to the client device 504, via the network 508, and presented to the user 501 on a display of the client device 504. If the user selects the purchase control, the request is sent by the client device 504, via the network 508, to the management service 510.

In response to receiving the request, the management service 510 sends to the client device 504 item variant information corresponding to the item represented in the image and associated with the selected purchase control. In some implementations, the item variant information may be sent with another image(s) of the item, additional details about the seller and/or the sale of the item.

If the seller selects to purchase the item, as illustrated in FIG. 5, the purchase request is sent from the client device 504 to the management service 510 and the management service 510 facilitates a purchase of the item between the seller 506 of the item and the user 501. In some implementations, the purchase of the item may be completed without the user 501 having to be redirected to the seller's website. For example, the management service may facilitate a payment (e.g., via a third party payment processor) by the user for the item on behalf of the seller and provide the seller with a payment confirmation. In addition to the payment confirmation, the management service 510 may provide the seller with any item variants selected by the user (e.g., size, color, shipping option), a delivery destination specified by the user, etc. In other implementations, payment credentials of the user may be provided by the management service 510 to the seller 506 for processing and order purchase completion. The payment credentials, delivery details, and/or other user related information may be provided by the user 501 to the management service 510 and/or maintained in the user profile data store 517.

The seller 506, upon receiving purchase confirmation or completing the purchase, initiates delivery of the item to the user. For example, if the item is a physical good, the seller 506 may cause the item to be delivered to a user specified delivery location. Likewise, if the item is a digital good, the item may be transmitted from the seller to the user 501, for example, via the network 508. The management service 510 may provide a confirmation message to the user 501 that the purchase of the item from the seller 506 has been completed.

As described, the implementations provide the ability to determine items represented in user provided images and match those items with a seller that offers the item for sale. While the examples described herein refer to a single seller as offering the item for sale, in other implementations, an item represented in a user provided image may be available for sale from multiple sellers. For example, if the item represented in the image is a sports shoe, that item may be available from multiple different sellers of sports shoes. In such an implementation, the user provided image of the item may be associated with each of the sellers and a mapping maintained in the mappings data store maintained by the management service. In some implementations, a single seller may be associated with the purchase control when the user provided image and the corresponding purchase control are sent to a requesting user. The single seller may be randomly selected, selected based on price, selected based on the user's past purchase history, the location of the user and the seller, and/or any other factor. Alternatively, the user may be provided a list of sellers upon activation of the purchase control.

In addition to the management service determining multiple sellers for an item represented in an image, in some implementations, multiple items may be represented in a single user provided image. In such instances, the image may be segmented based on the various positions of the represented items, sellers determined for the different items, and different purchase controls presented with each of those items.

Figure 6:
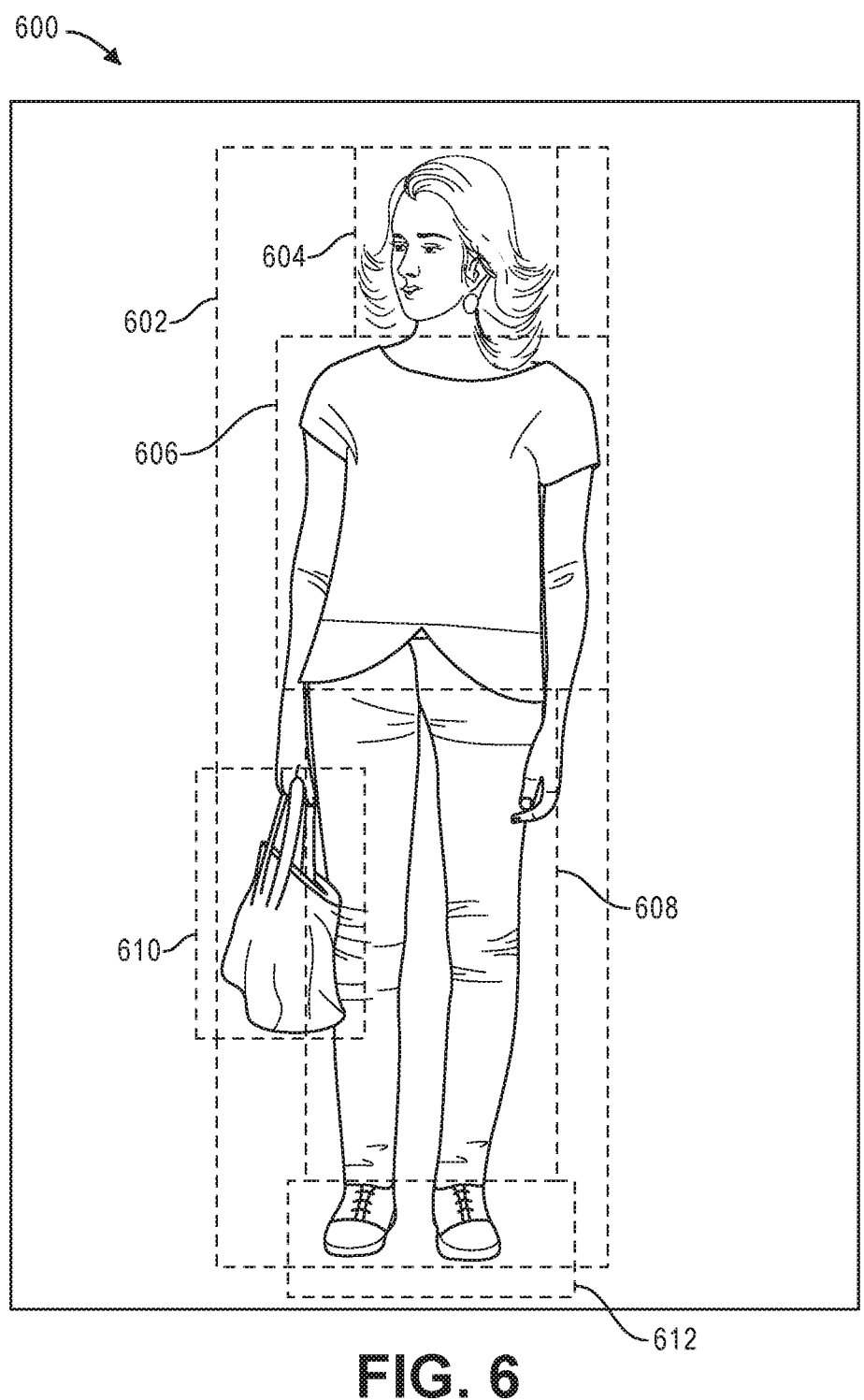
FIG. 6 is a representation of a segmented image, according to an implementation.

For example, referring to FIG. 6, illustrated is a representation of a segmented user provided image that includes a plurality of items offered for sale by different sellers, according to an implementation. An image, such as image 600, may be segmented using image segmentation techniques. For example, a background of the image may be determined (e.g., based on out of focus regions and/or similar colors) and removed from processing. Likewise, six objects have been identified and the image segmented into six different regions. Specifically, a body object 602, a head object 604, a shirt object 606, a pants object 608, a bags object 610, and a shoes object 612. As part of the segmenting, the root object, in this example the body object 602, was determined and the location of other objects 604-612 considered when identifying those other objects. Segmentation of images is described in further detail in U.S. patent application Ser. No. 14/279,871 entitled "Image Based Search," which is herein incorporated by reference in its entirety.

In other implementations, an image may be segmented using other segmentation and identification techniques. For example, images may be segmented using crowd sourcing techniques. For example, as users view an image, they may select regions of the image that include objects and the image may be segmented based on the location of objects within the image. As more users identify objects within images, the confidence of the identity of those objects increases. Based on the user provided segmentation and identification, the objects within the image can be identified and a determination made as to whether the object is an item offered for sale by a seller.

For example, each segment may be processed to generate feature vectors for the item represented in the segment and those feature vectors may be compared with feature vectors associated with items identified in the item catalog data store. Alternatively, or in addition thereto, the segments of the image may be processed and the item classified into one or more categories. For example, the shirt object 606 of the image 600 may be processed to detect the object (shirt) represented in the segment that contains the shirt object 606 and the segment may be associated with a category representative of shirts (or another relevant category). As discussed above, the representation of the object (shirt) may be compared with items offered for sale by sellers associated with the category shirts and/or compared with items offered for sale that are associated with the category shirts to determine if the object represented in the segment of the image corresponds with an item offered for sale by a seller. This processing may be done for each object and/or segment of the image to determine items represented in the image that are offered for sale by one or more sellers.

Figure 7:
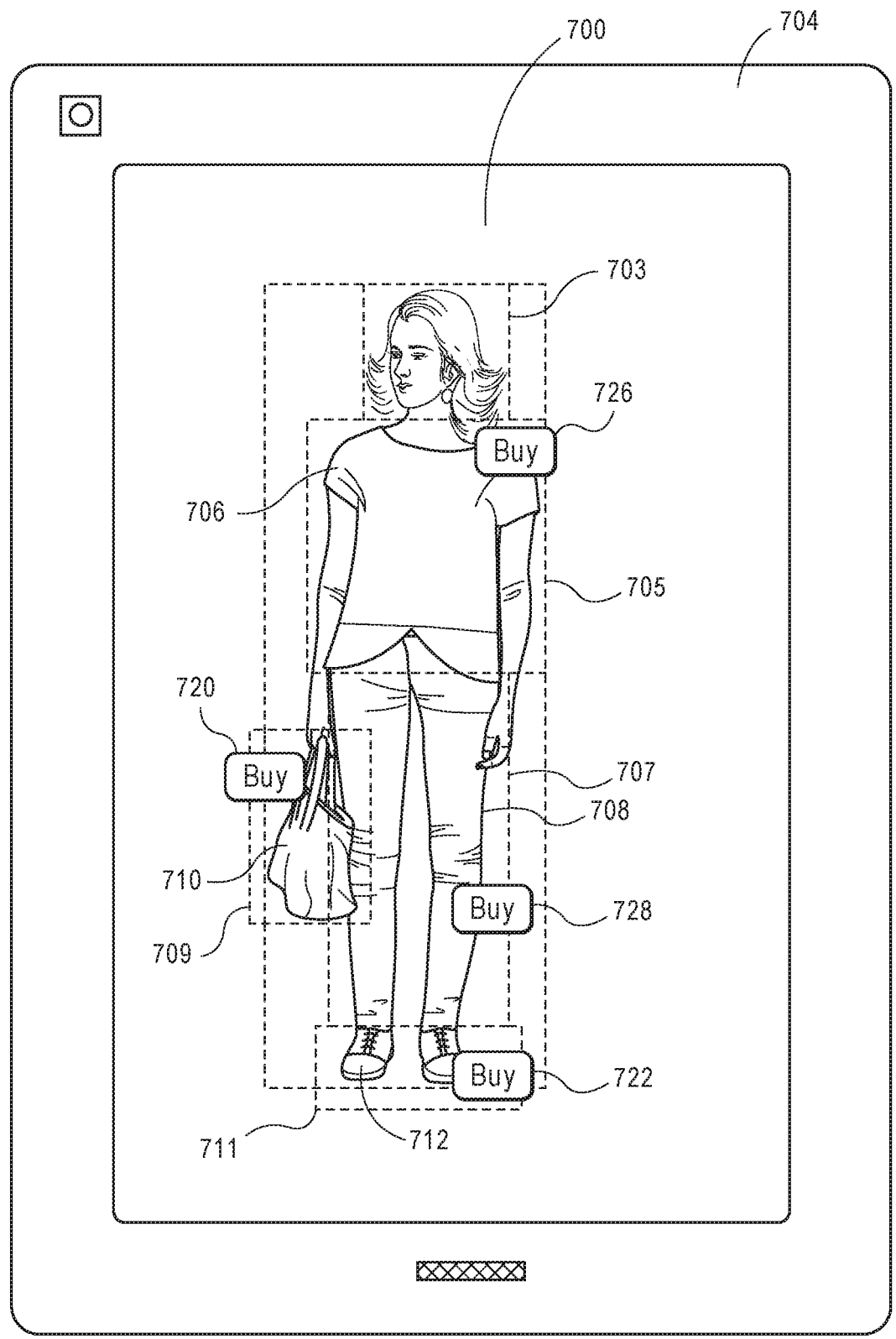
FIG. 7 is a representation of a segmented image with purchase controls associated with represented items available for purchase from one or more sellers, according to an implementation.

FIG. 7 is a representation of a segmented image 700 presented on a display of a client device 704 with purchase controls associated with objects of the image that are determined to be items offered for sale by one or more sellers, according to an implementation. For each item determined in the segmented image to be available for purchase from one or more sellers, a purchase control may be presented near the determined item that is selectable by the user. In this example, a shirt 706 has been determined in a first segment 705 of the image 700 and a purchase control 726 is presented near the presentation of the shirt. Similarly, a bag 710 has been determined in a second segment 709 of the image and a purchase control 720 is presented near the presentation of the bag. A pair of pants 708 has been determined in a third segment 707 of the image 700 and a purchase control 728 is presented near the presentation of the pants 708. Finally, a pair of shoes 712 has been determined in a fourth segment 711 of the image 700 and a purchase control 722 is presented near the presentation of the shoes 712.

While the majority of the segments of the image 700 have been determined to include a representation of an item offered for sale by a seller, the segment 703 that includes the object of a person's head is determined to not include an item that is offered for sale by the seller. Because the object (person's head) represented in the segment 703 is determined to not be an item offered for sale by a seller, a purchase control is not presented near the presentation of that object.

Figure 8:
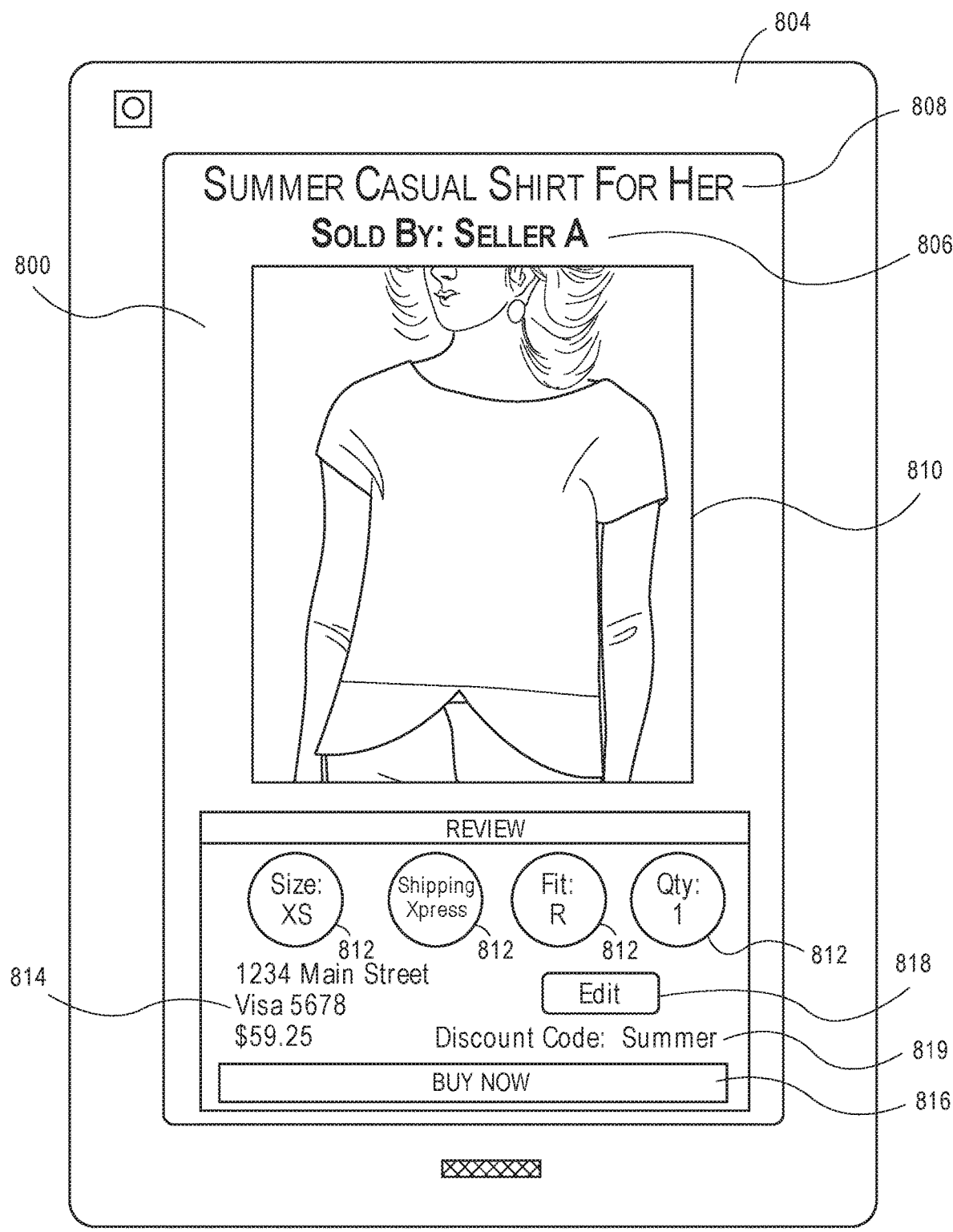
FIG. 8 is a representation of an item and item variants available from the seller of the item, according to an implementation.

A user may view the image 700 on the client device 704 and selectively interact with one or more of the purchase controls to obtain additional details about an item associated with the purchase control. For example, FIG. 8 is a representation of an item and item variants for the shirt item, according to an implementation. The information 800 presented on the display of the client device 804 is generated in response to the user selecting the purchase control 726 (FIG. 7) associated with the shirt item. In this example, upon selection of the purchase control 726, an additional view 810 of the shirt item is presented to the user along with a name 806 of the seller of the item, in this example Seller A, from which the item may be purchased. A name of the item "Summer Casual Shirt For Her" 808 may also be included in the presented information 800. The management service, as discussed above, may also obtain and provide item variant information 812, such as a size, fit, color, shipping method, and/or quantity of the shirt. The user may alter or select item variant information by, for example, interacting with the presentations of the item variant information. In addition, a user may also be presented with purchase and/or shipping information 814 that is currently associated with the user of the client device 804 that will be used by the management service to facilitate a purchase of the item if the user selects the "Buy Now" control 816. A user may alter the purchase and/or shipping information 814 by selecting the "Edit" control 818 and providing or selecting alternative information. Any type or form of payment method may be used with the implementations discussed herein. For example, the user profile maintained by the management service that is associated with the user may include credit card information, as illustrated, that is used to facilitate a purchase between the user and the seller of the item. In other implementations, other forms of payment, such as bank transfers, e-commerce payment processors, etc. may likewise be utilized.

In some implementations, a discount code 819 or other promotion may be associated with the item represented in the additional view 810. For example, if Seller A 806 is offering a promotion for the item that is received if a discount code 819 is provided as part of the checkout process, the discount code 819 may be automatically identified and included in the information 800 presented on the display of the client device 804. In some implementations, the discount code 819 is provided by the seller as an item variant for the item. In other implementations, a user may alter, update or provide a discount code 819 by selecting the discount code 819 and providing such information.

The additional view 810 of the item may be in the form of a digital still image, a video file, an animated .gif file, etc. For example, the additional view 810 may include a presentation of an animated .gif file that can be manipulated by a user to alter a presented view of the item. For example, if the client device 804 includes a touch-based display, a user may manipulate or control the presentation of the .gif file by moving their finger on the touch-based display to obtain different views of the presented item. In one implementation, the user may control the presentation of the image and rotate the image to obtain front, back, side and/or other views of the image, effectively providing a 360 degree view of the image.

In some implementations, a user may view and/or provide comments, reviews, ratings, and/or other information related to the item represented in the additional view 810. In some implementations, a user may also be presented with an identification of related items often viewed or purchased with the item represented in the additional view 810. A related item is an item that is often purchased with the item or viewed by users when viewing the item represented in the additional view 810. For example, if other users of the management service often purchase the item "Summer Causal Shirt For Her" from Seller A and also purchase a pair of matching shorts, the information 800 may also identify the pair of matching shorts to the user as an item that is often purchased with the item represented in the additional view 810. The user may obtain additional information about the pair of matching shorts by selecting the identified pair of matching shorts.

Figure 9:
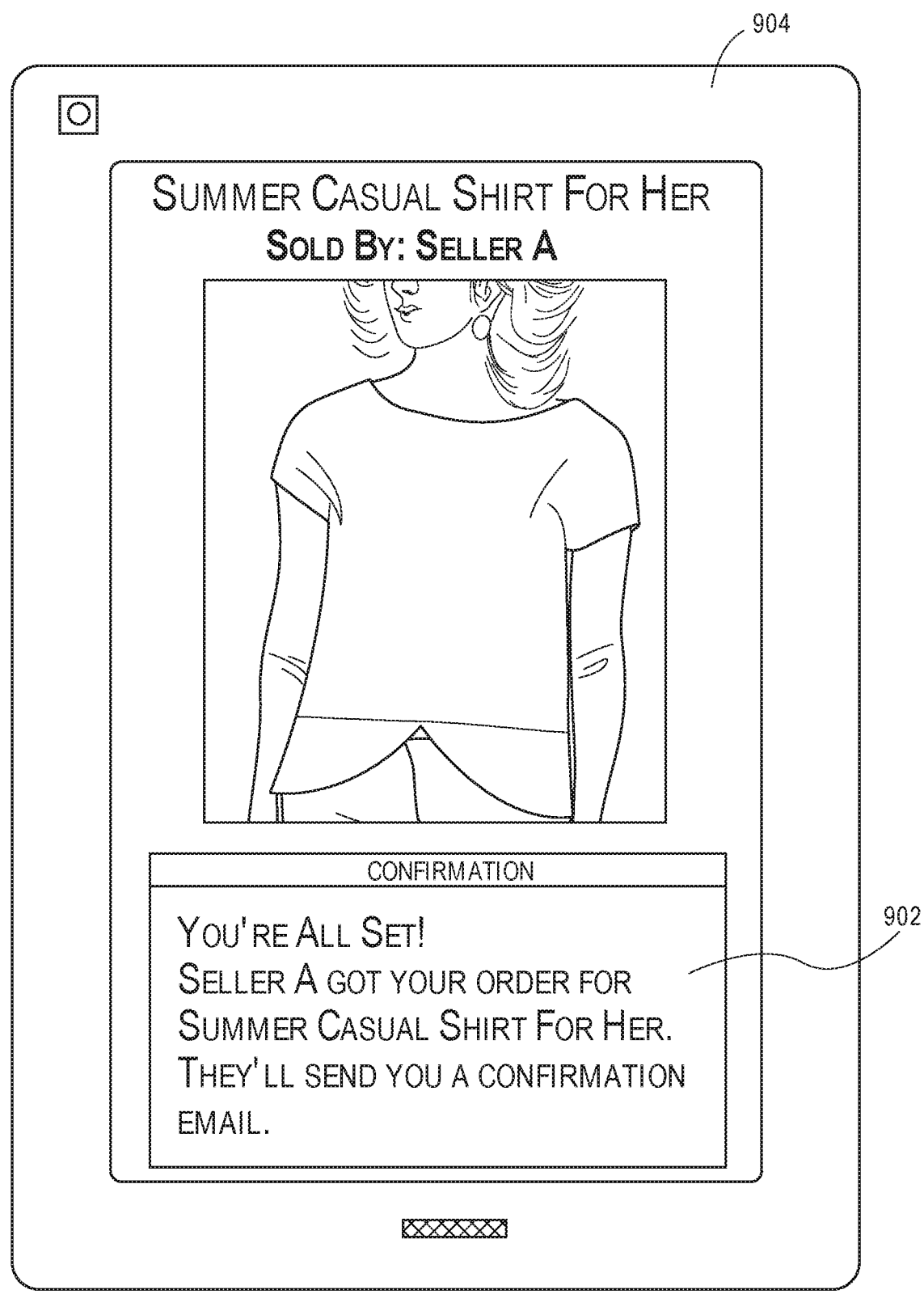
FIG. 9 is a representation of a purchase confirmation for an item, according to an implementation.

If a user selects the "Buy Now" control 816, the management service facilitates a purchase of the item between the user and the seller. Facilitating purchase of the item is discussed further below with respect to FIG. 13. In addition to facilitating purchase, the management service may also send a confirmation message to the user, as illustrated in FIG. 9. In this example, the management service sends to the client device 904 a confirmation message 902 identifying that the seller of the item received the order from the user for the item and that the seller will send the user a confirmation email.

Figure 10:
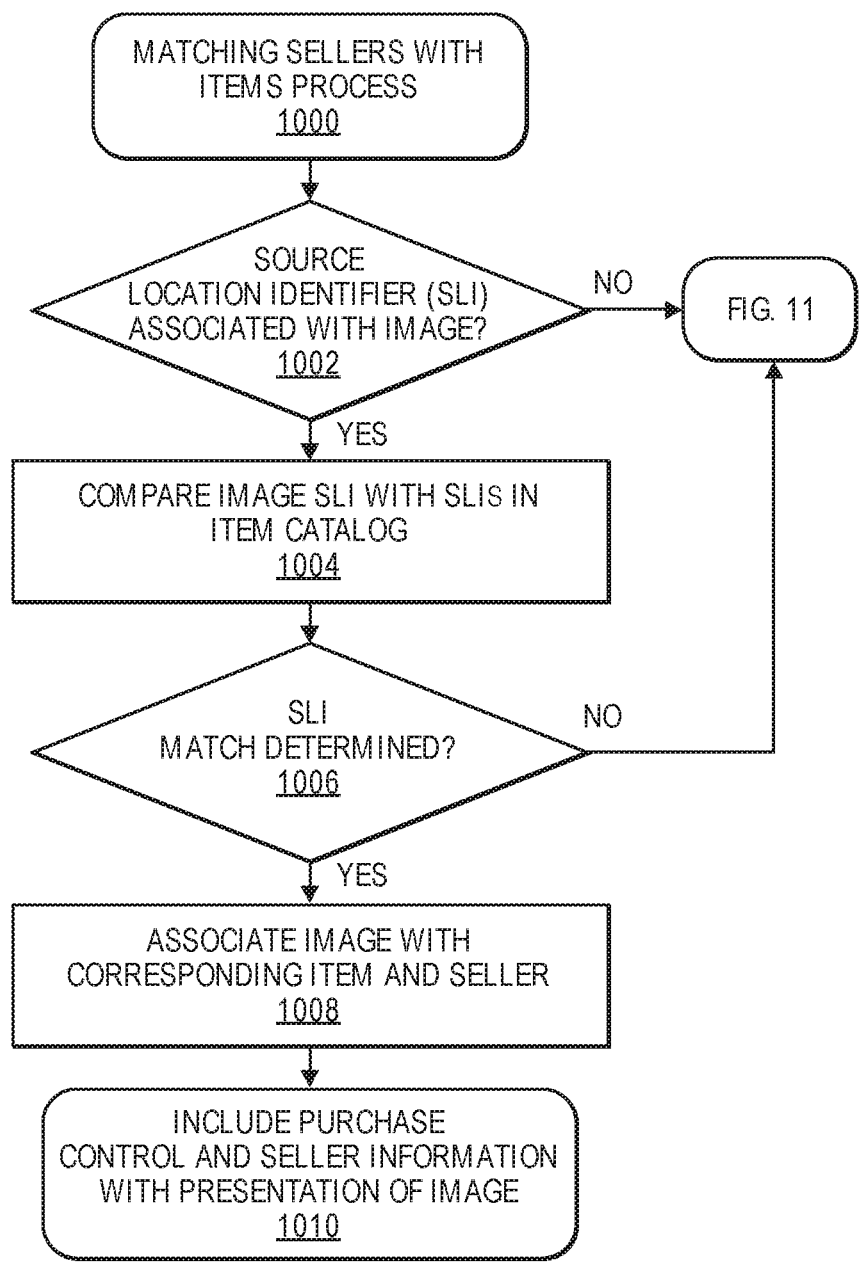
FIG. 10 illustrates an example process for matching sellers with user provided representations of items, according to an implementation.

FIG. 10 illustrates an example process 1000 for matching sellers with items, according to an implementation. The example process 1000 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 1000 begins by determining if there is a source location identifier, such as a URL, GPS coordinates, barcode, etc., included in the image information of a user provided image, as in 1002. As discussed above, a user provided image may be already stored in an image data store of the management service or may be provided to the management service by the user. The user provided image may be any image or representation of an object that is provided by the user to the management service. For example, the user provided image may be an image obtained with an image capture device of a user's client device, an image copied from another website, an image from an electronic message, etc.

An image may include a source location identifier, such as a URL, if the image is obtained from another location (e.g., a website) on a network, such as the Internet. In another example, the source location identifier may identify a physical location at which the image was captured by an image capture device (camera). For example, when a camera obtains an image, it may include in the image information the GPS coordinates (latitude and longitude) identifying the position of the image capture device when the image was obtained.

If it is determined that the user provided image does not include a source location identifier, the example process 1000 proceeds to the example process 1100 discussed below with respect to FIG. 11. However, if it is determined that the user provided images does include a source location identifier, the source location identifier of the user provided image is compared to source location identifiers maintained in the item catalog data store, as in 1004. As discussed above, the item catalog data store maintains a list of items offered for sale by one or more sellers. As the source location identifiers are compared, a determination is made as to whether the source location identifier of the user provided image matches a source location identifier of an item identified in the item catalog, as in 1006.

If it is determined that the source location identifier of the user provided image does not match any of the source location identifiers of the items in the item catalog data store, the example process 1000 proceeds to the example process 1100 discussed below with respect to FIG. 11. If it is determined that the source location identifier of the user provided image does match a source location identifier of an item in the item catalog data store, the user provided image is associated with the corresponding item from the item catalog data store and/or the seller that offers the item for sale, as in 1008. This association is maintained in the mapping data store by the management service.

Based on the association between the user provided image and the item identified in the item catalog data store and/or the seller of the item, each time the user provided image is presented to a user, such as when a user requests to view the user provided image, the presentation of the image will include a purchase control and/or seller information, as in

1010. The purchase control, as discussed above, may be selected by the user to obtain additional information about the item represented in the user provided image and/or to initiate a purchase of the item. The seller information identifies a seller of the item represented in the image. If multiple sellers are associated with the item represented in the image, the seller information may identify one of the sellers, a seller determined based on a provided advertising amount for the item, multiple sellers, provide an indication that more than one seller is offering the item represented in the user provided image for sale, etc. A user requesting to view the user provided image may be the user that provided the image, or any other user of the management service.

While the example illustrated in FIG. 10 describes matching a user provided image with a seller if the source location identifier of the user provided image matches the source location identifier of an item listed in the item catalog data store, in some implementations, additional analysis may be performed before the user provided image is determined to include a representation of the item offered for sale by the seller. For example, the user provided image may be processed to determine if the image is similar to or matches the image or the image information included with the item identified in the item catalog as having a matching source location identifier. In other implementations, additional image information, such as a creation date, file size, hash value, color histogram, etc., may be compared to obtain additional confirmation that the user provided image includes a representation of the item offered for sale by the seller. In some implementations, all or a portion of FIG. 11 may be performed in conjunction with the example process 1000.

Figure 11:
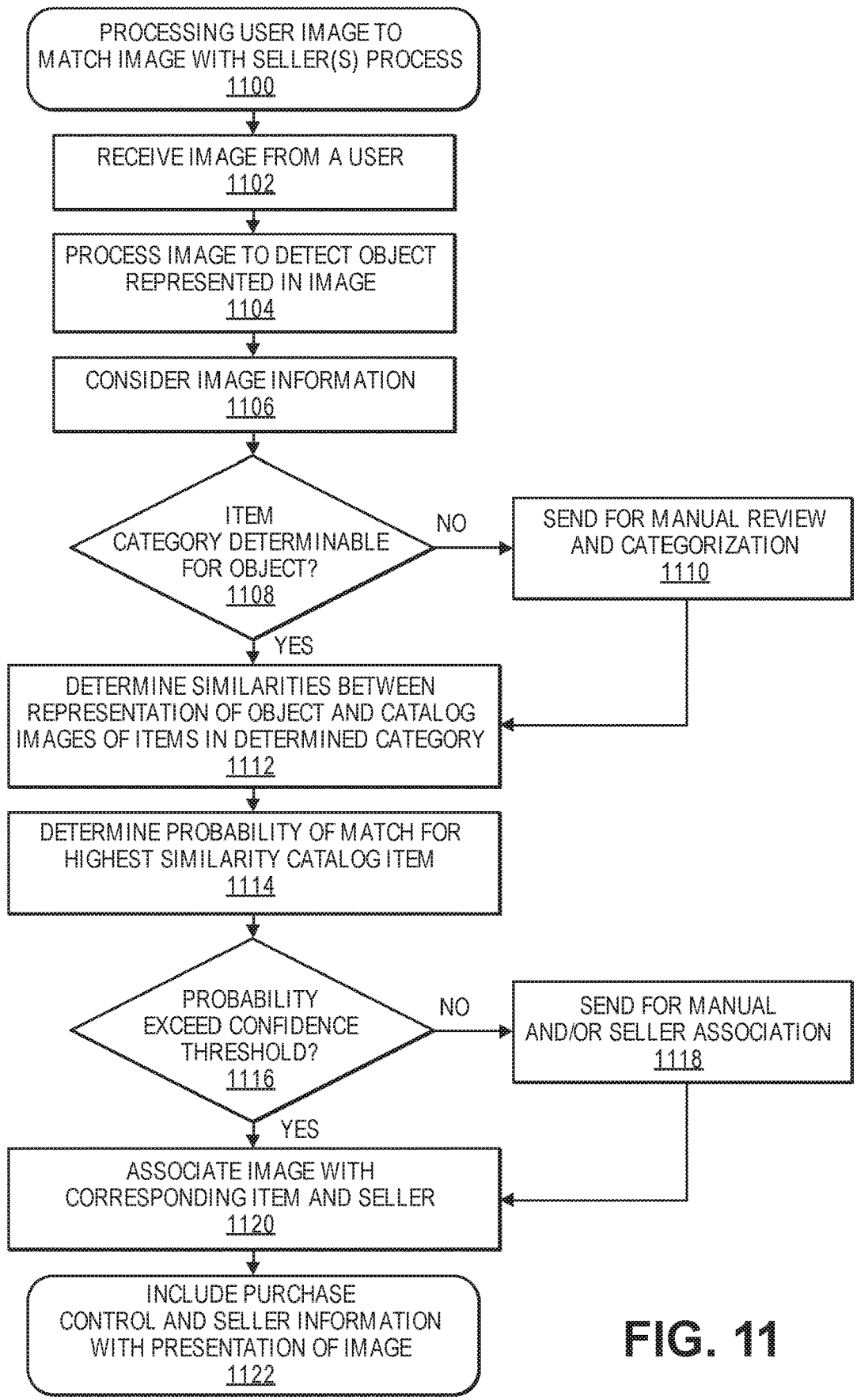
FIG. 11 illustrates an example process for processing a user provided image to match an item represented in the image with a seller of the item, according to an implementation.

FIG. 11 illustrates an example process 1100 for processing a user provided image to match an item represented in the image with a seller of the item, according to an implementation. The example process 1100 begins by receiving the image from a user, as in 1102. The received image is then processed using one or more image processing algorithms, such as edge detection, object detection, grey scale analysis, etc., to determine objects represented in the image, as in 1104. In some implementations, feature vectors representative of the image and/or objects within the image may also be generated.

In addition to processing the image, image information such as source location identifier, comments added by the user that provided the image, comments added by users that viewed and/or shared the image, the time, date and/or location associated with the image, etc., may also be considered, as in 1106. Based on the processed image and the image information, a determination is made as to whether an item category can be determined for an object represented in the image, as in 1108. In some implementations, the management service may maintain a list of item categories for items that are offered for sale by different sellers. Each item category may include one or more item characteristics, such as a description, representative images of items associated with the item category, representative shapes, sizes and/or colors of items that may be associated with the item category, etc. Likewise, a seller may be associated with an item category based on the types of items that the seller offers for sale. Likewise, items offered for sale may be associated with one or more item categories based on the item type.

In determining if the object represented in the user provided image may be associated with an item category, the processed image and/or image information is compared with the characteristics of each item category to determine if the object represented in the image is similar to an item category. For example, the size, shape and/or color of the determined object may be compared with the size(s), shape(s), and color(s) characteristics of an item category to determine a similarity between the object and the item category.

If the object represented in the user provided image cannot be associated with an item category, the image is sent for manual review and categorization, as in 1110. Manual review and categorization may include one or more humans reviewing the user provided image to determine a category for the object represented in the image. The human(s) may be an employee of the management service, a user of the management service, a seller, etc.

If it is determined that the object represented in the image can be associated with a category, or upon manual categorization, similarities between the object represented in the user provided image and the images of the item catalog associated with the determined category are determined, as in 1112. For example, the processed image information (e.g., feature vectors, histogram) from the user provided image may be compared with image information relating to the images corresponding to the items identified in the item catalog to determine a similarity between the images.

Based on the similarities between the user provided image and the stored images, a probability is determined for the stored image having the highest similarity to the user provided image, indicating how likely it is that the stored image corresponds to the user provided images, as in 1114. The probability may be based on a difference between the determined similarity scores. For example, if the highest similarity score is 95% and the next highest similarity scores are 45% and 34%, there may be a high probability that the stored image having the highest similarity score corresponds with the user provided image. In comparison, if the highest similarity score is 95% and the next highest similarity scores are 94% and 93%, even though the images are similar, there is a low probability that the stored image with the highest similarity score corresponds to the user provided image because any of those images may actually include the item represented in the user provided image.

Based on the probability score for the stored image with the highest similarity, a determination is made as to whether the probability exceeds a confidence threshold, as in 1116. The confidence threshold may be any number, score, or other indicator that must be achieved for the probability score to exceed the threshold. The confidence threshold may be different for different images, different users, different times of day, etc.

If the probability score does not exceed the threshold, the image is sent for manual association by one or more humans, as in 1118. In some implementations, the image, image data, stored images associated with items in the item catalog corresponding to the same category, and/or the stored images having the highest similarity scores may also be sent to the one or more humans for manual association. The one or more users may be employees of the management service, employees of the potential seller of the item, users of the management service, etc.

If it is determined that the probability exceeds the confidence threshold, or upon manual association, the user provided image is associated with the item identified in the item catalog and/or the seller of the item identified in the item catalog, as in 1120. This association is maintained in the mapping data store by the management service. Likewise, the source location identifier from the item catalog may be included in the image information for the image and stored in the image data store.

Based on the association between the user provided image and the item identified in the item catalog data store and/or the seller of the item, each time the user provided image is presented to a user, such as when a user requests to view the user provided image, the presentation of the image will include a purchase control and/or seller information, as in 1122. The purchase control, as discussed above, may be selected by the user to obtain additional information about the item represented in the user provided image and/or to initiate a purchase of the item. The seller information identifies a seller of the item represented in the image. If multiple sellers are associated with the item represented in the image, the seller information may identify one of the sellers, a seller based on a provided advertising amount for the item, multiple sellers, provide an indication that more than one seller is offering the item represented in the user provided image for sale, etc. A user requesting to view the user provided image may be the user that provided the image, or any other user of the management service.

Figure 12:
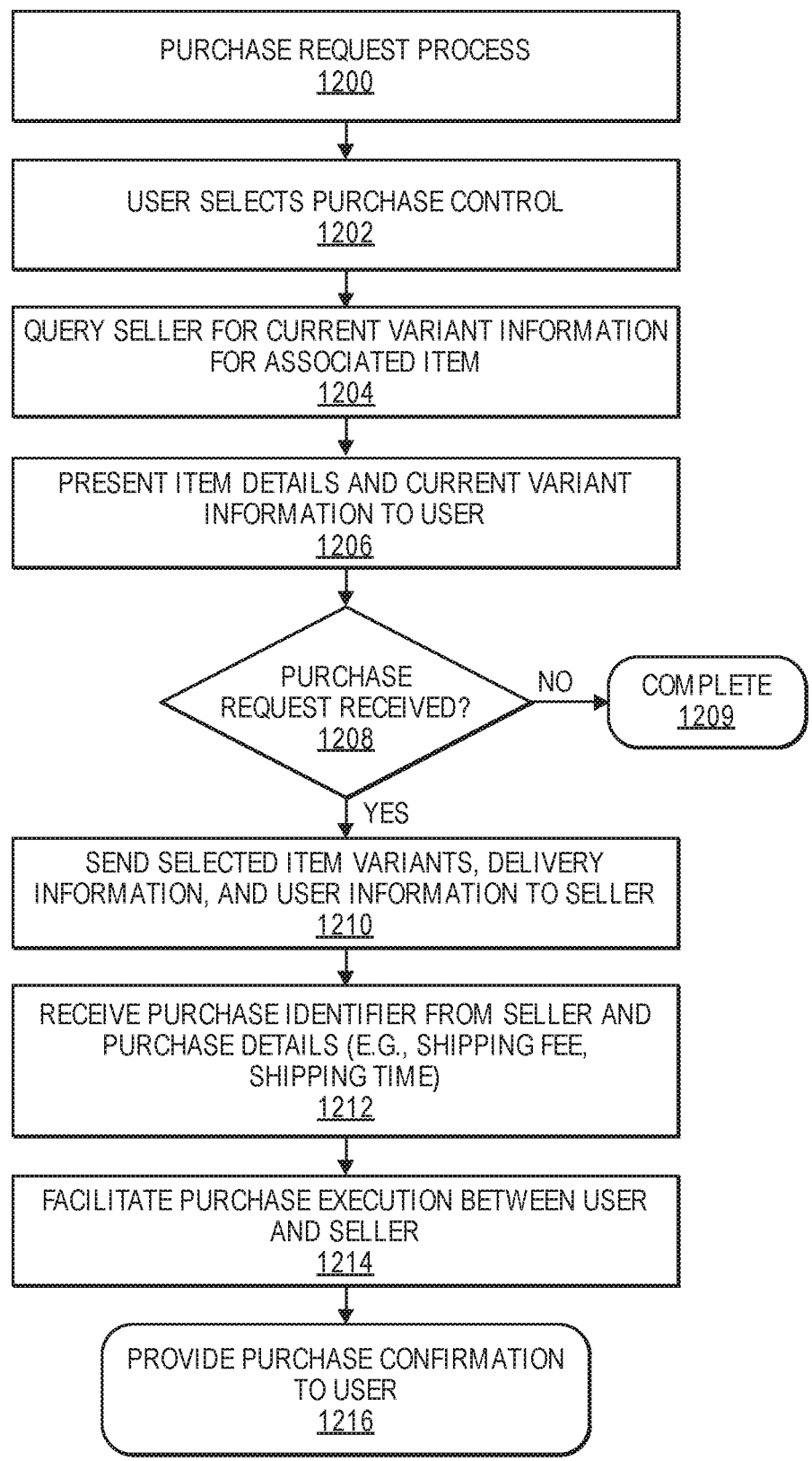
FIG. 12 illustrates an example purchase request process, according to an implementation.

FIG. 12 illustrates an example purchase request process 1200, according to an implementation. The example process 1200 begins upon selection by a user of the purchase control, as in 1202. As discussed above, a purchase control is presented with a user provided image when the user provided image is determined to include a representation of an item offered for sale by a seller.

Upon receiving a selection of a purchase control, the seller is queried for current item variant information corresponding to the item represented in the image, as in 1204. As discussed above, in some implementations, the seller may be queried for item variant information in response to selection of a purchase control, the seller may periodically send item variant information to the management service, and/or the seller may provide updates to item variant information when an item variant changes.

The example process 1200 also sends to the client device of the user, item details and current item variant information for presentation to the user, as in 1206. As illustrated and discussed above with respect to FIG. 8, the presentation to the user may include additional views of the item, current item variant information, purchase details, etc. Likewise, as discussed above, the user may modify and/or select particular item variants for the item that may be used to complete a purchase of the item. For example, the user may select a particular size, color, and/or other variants for an item that may be used in the purchase and/or delivery of the item.

A determination is then made as to whether a purchase request has been received, as in 1208. For example, a user may select to purchase an item upon selecting desired variants and providing purchase details (e.g., delivery destination, credit card information, delivery time). If a purchase request is not received, the example process completes, as in 1209. However, if it is determined that a purchase request has been received, the selected item variants, delivery information, and user information for the user initiating the purchase are sent to the seller of the item, as in 1210.

In response to sending the selected item variants, delivery information, and user information to the seller, the example process 1200 receives from the seller a purchase identifier that identifies the purchase transaction and purchase details (e.g., shipping fee, identification tag, shipping time), as in 1212.

Based on the user provided information, and the seller provided purchase information, the example process 1200 facilitates purchase of the item between the user and the seller, as in 1214. Finally, once the purchase has been completed, a purchase confirmation is sent to the user, as in 1216. The purchase confirmation may be sent in the form of a presentation on the user's client device, an electronic message ("e-mail"), a text message, etc.

Figure 13:
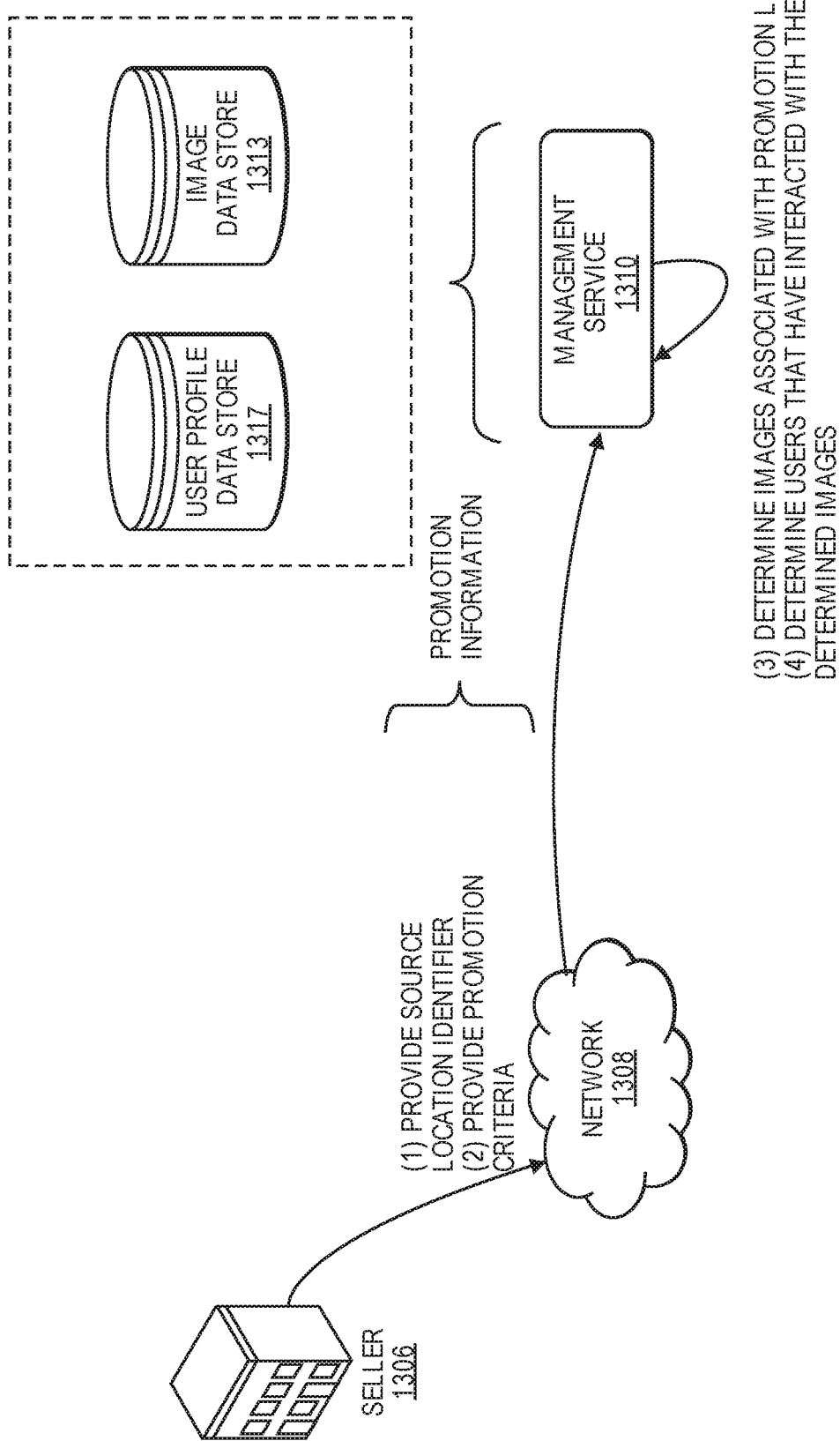
FIGS. 13-14 are block diagrams of an example implementation for establishing a promotion and promoting images to users, according to an implementation.

FIG. 13 is block diagram of an example implementation for establishing a promotion campaign for a seller 1306, according to an implementation. The example implementation begins with a seller 1306 providing promotion information via a network 1308, such as the Internet, to the management service 1310. The promotion information may simply include a source location identifier, such as a URL, GPS coordinates, barcode, etc. As discussed, the source location identifier is used by the management service to determine images of items that are to be utilized as part of the promotion.

In some implementations, the promotion information may also include promotion criteria, such as, but not limited to, a start date for the promotion, an end date for the promotion, a budget for the promotion, a user group or user type to be targeted for the promotion, a location for the promotion, devices types to which the promotion is to be delivered, etc.

Upon receipt of promotion information from a seller 1306, the management service 1310 processes the image data store 1313 to determine images that are to be included in the promotion campaign. These images may be user provided images and/or any other images maintained in the images data store 1313. For example, the management service may determine images that include the source location identifier, or a portion thereof, in the image information for the image. For example, if the seller 1306 provides a source location identifier of www.sellerA.com, the management service 1310 may process the information maintained in the image data store 1313 to determine images that also include the source location identifier www.sellerA.com, or a variation thereof, in the image information. For example, if image information for an image includes a source location identifier of www.sellerA.com/shoes, it may be included in the promotion campaign because the source location identifier provided by the seller for the campaign is more general than the source location identifier included in the image information. In comparison, if the seller provides a source location identifier of www.sellerB.com/boots, and the image information for a stored images includes a source location identifier of www.sellerB.com, that image may not be included in promotion campaign because it is not specific to the source location identifier for which the campaign is being created. As will be appreciated, any variation of source location identifiers may be utilized to include or exclude images from a promotion campaign.

In addition to determining a plurality of images from the image data store 1313 that are to be included in the promotion campaign based on the provided promotion information and corresponding image information, the management service 1310 may also determine a plurality of users to which the promotion campaign is to be targeted. For example, user information maintained in the user profile data store 1317 may be processed to determine users that have interacted with at least one of the plurality of images determined for inclusion in the promotion campaign. As discussed above, the user profile information may identify which stored images have been viewed by a user, posted by a user, shared by a user, forwarded by a user, commented on by a user, rated by users, a frequency of times the image was viewed by the user, a duration of a view by the user, etc. In some implementations, the user profile information may also indicate an interaction type for each image with which the user interacted. For example, if a user is interacting with multiple images of a similar type during a short period of time it may be determined for those images that the user is in a planning mode (an interaction type). In comparison, if a user is returning to an image with which they have previously interacted, or the user obtains additional information about an item represented in an image (e.g., user the user traverses to a website associated with an interacted image), it may be determined that the user is in a selection mode (an interaction type). As will be appreciated, any number of interaction types may be maintained for different types of behaviors of users.

If a user is determined to have interacted with one or more of the images determined to be included in the promotion campaign, the user may be determined to be included in the promotion campaign.

Based on the received promotion information, determined images, and determined users, the promotion campaign is then established by the management service on behalf of the seller. In contrast to traditional promotion or advertising campaigns in which the seller must provide the promotional material, the present implementations enable sellers to easily establish promotion campaigns by simply providing a source location identifier that is used by the management service to determine promotional material (e.g., images) for inclusion in the campaign on behalf of the seller. Likewise, the images determined to be included in the promotion campaign may be seller provided images and/or images provided by users of the management service.

Figure 14:
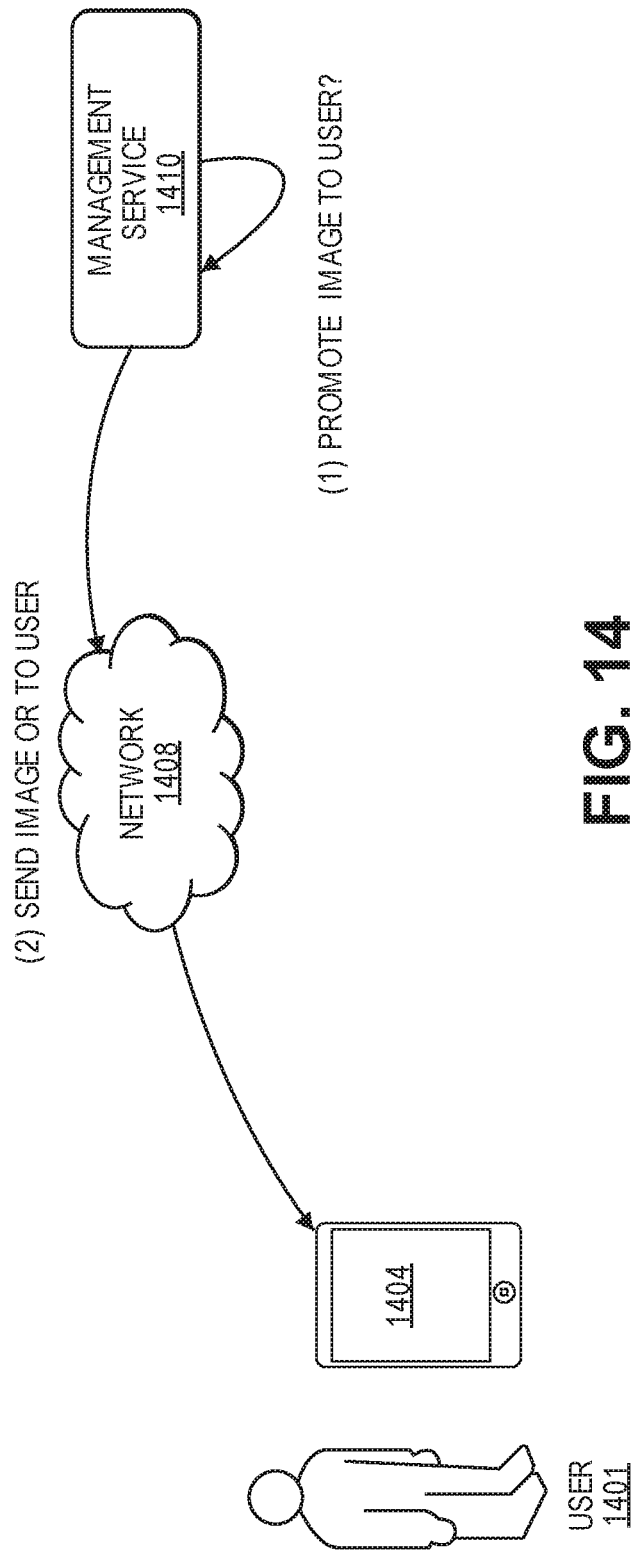

FIG. 14 is block diagram of an example implementation for executing a promotion campaign on behalf of a seller, according to an implementation. When a campaign begins, and during the promotion campaign, the management service determines, for each user included in the campaign, whether one or more images included in the promotion campaign are to be sent for presentation to the user 1401 as a promotion. For example, users determined to be included in a promotion may be periodically processed to determine whether a defined time has elapsed since they last interacted with an image included in the campaign. For example, a threshold (e.g., three days) may be established and once a time duration has elapsed that exceeds that threshold, it may be determined that the image is to be sent for presentation to the user via a client device 1404. In some implementations, the threshold may vary for different users, different images, different interaction modes, etc. For example, images interacted with by the user when in a planning mode may have a first threshold and images interacted with by the user when the user is in a selection mode may have a second threshold that is different than the first threshold.

If it is determined that an image of the promotion is to be sent to the user, the image is sent by the management service 1410 to a client device 1404 associated with the user 1401 via a network 1408, such as the Internet. In some implementations, the image that the user was determined to have interacted with is sent to the user as the promotion. Because the user has previously interacted with the image, it can be inferred that there is potential interest by the user in the item represented in the image.

In other examples, as discussed further below, rather than sending the same image to the user that the user previously interacted with, a secondary image that is included in the promotion campaign may be sent to the user as a promotion. A secondary image may be, for example, determined based on at least one of a user preference, a user image view history, a user purchase history, a similarity between the image the user interacted with and the secondary image, a first item represented in the secondary image corresponding to a second item represented in the image the user interacted with, the first item represented in the secondary image being a complementary item to the second item represented in the image the user interacted with, the first item represented in the secondary image being a substitute item for the second item represented in the image the user interacted with, the secondary image including a representation of an item represented in the image the user interacted with, etc.

A user, upon receiving an image as a promotion, may interact with the image to obtain additional information about the represented item and/or the seller, to purchase the item, etc. User interaction with an image provided as a promotion, may be implemented in a manner similar to the interactions discussed above. Likewise, the image sent as a promotion may include seller information and/or a purchase control, among other information.

Figure 15:
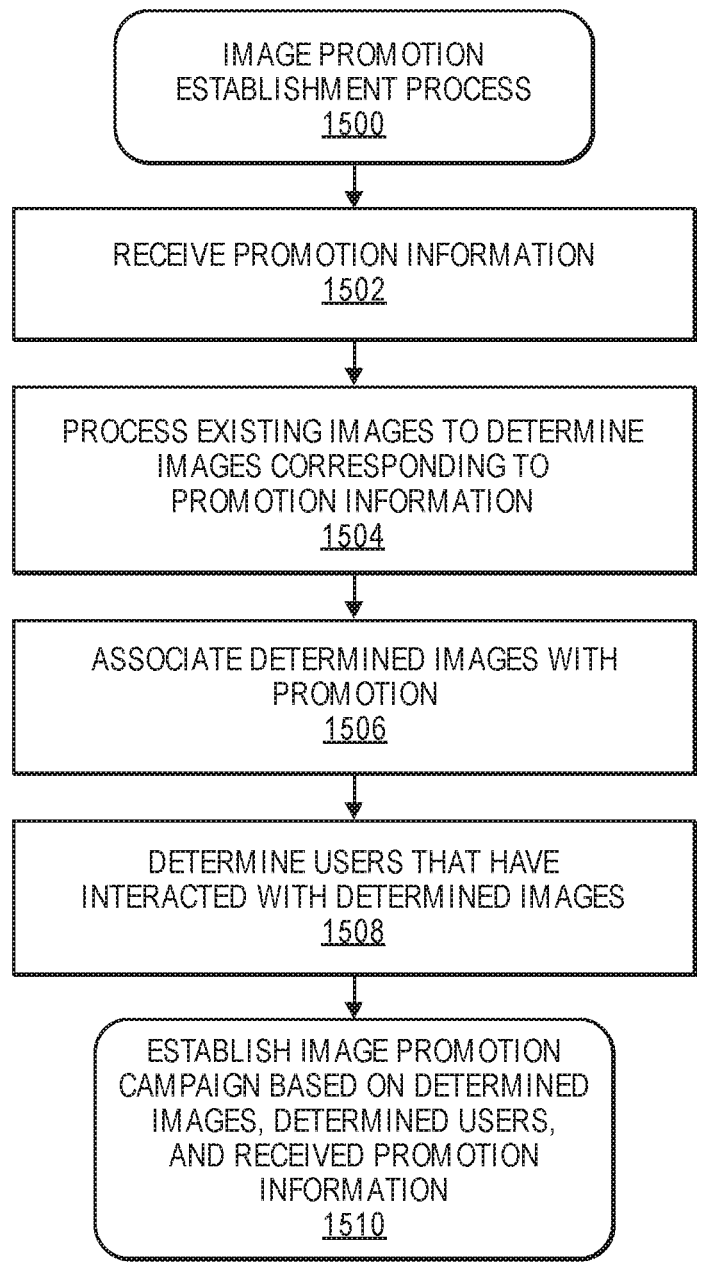
FIG. 15 illustrates an example image promotion establishment process, according to an implementation.

FIG. 15 illustrates an example image promotion establishment process 1500, according to an implementation. The example process 1500 begins upon receipt of promotion information, as in 1502. As discussed above, the promotion information may include a source location identifier (e.g., URL) and/or promotion criteria. Promotion criteria may, among other things, specify at least one of a promotion campaign duration, a campaign price, a user profile toward which the promotion campaign is to be targeted, a promotion campaign budget, etc.

Upon receipt of promotion information, existing images maintained in an image data store by the management service are processed to determine images that include the source location identifier in the associated image information, as in 1504. For example, if the source location identifier is www.sellerA.com, the management service may process the information maintained in the image data store to determine images that also include the source location identifier www.sellerA.com, or a variation thereof in the image information. For example, if image information for an image includes a source location identifier of www.sellerA.com/shoes, it may be included in the promotion campaign because the received source location identifier is more general than the source location identifier included in the image information. In comparison, if the received source location identifier is www.sellerB.com/boots, and the image information for a stored image includes a source location identifier of www.sellerB.com, that image may not be included in promotion campaign because it is not specific to the source location identifier for which the campaign is being created. As will be appreciated, any variation of source location identifiers may be utilized to include or exclude images from a promotion campaign. Each image determined to include the received source location identifier is associated with the promotion, as in 1506.

In addition, the management service may process the user profile information data store to determine users that have interacted with the determined images, as in 1508. If it is determined from the user profile that a user has interacted with one or more images included in the promotion, the user is also included in the promotion. In some implementations, a user must interact with the image a defined number of times and/or viewed the image for a defined time duration before the user is included in the promotion campaign. In some implementations, if the promotion information includes a target user type, only users that have interacted with at least one of the plurality of images and satisfy the target user type may be included in the promotion. For example, if the promotion information indicates that the promotion is to be targeted toward males in the age range of 25-30 years of age, the management service may only include users that have previously interacted with at least one of the plurality of images, that are male and between the age range of 25-30 years of age.

Finally, based on the received promotion information, the determined images, and determined users, a promotion campaign is established by the management service on behalf of the seller, as in 1510. A promotion campaign is used to promote images, and thus the items represented in those images, to users that have previously interacted with at least one image of the plurality of images. By directing the promotion campaign to users that have previously interacted with one or more of the images, the audience has already provided an indication of potential interest in the promoted material. As such, there is an increased potential for a conversion (e.g., item purchase) resulting from the promotion.

Figure 16:
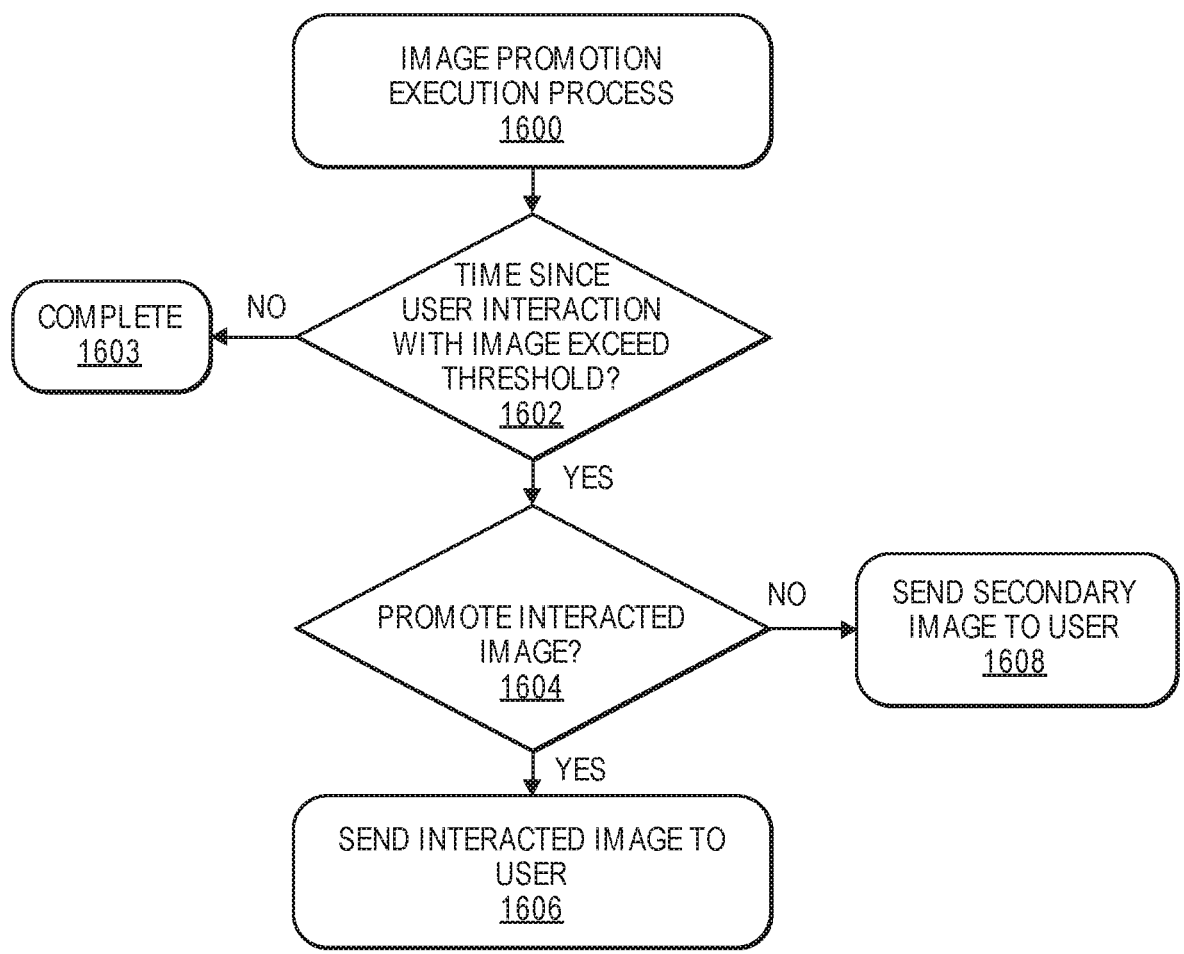
FIG. 16 illustrates an example image promotion execution process, according to an implementation.

FIG. 16 is a flow diagram of an example image promotion execution process 1600, according to an implementation. The example process 1600 begins by determining a time duration since a user included in the promotion campaign last interacted with an image of the promotion campaign, as in 1602. For example, a defined time duration, or threshold, may be established and a counter maintained for a user to determine a time duration since a last interaction with an image included in the promotion. The threshold may be any defined time duration (e.g., 3 days, 5 days, etc.). Likewise, in some implementations, the threshold may vary for different users, different sellers, different items, different categories of items, different interaction types, etc. For example, a first threshold may be maintained for items with which a user interacted while in a planning mode and a second threshold may be maintained for items with which the user interacted while in a selection mode.

If it is determined that the time duration does not exceed the threshold, the example process 1600 completes, as in 1603. However, if it is determined that the time duration does exceed the threshold, a determination is made as to whether the image that the user previously interacted with is to be sent to the user, as in 1604.

Any number of factors may be considered in determining whether to send the image that the user previously interacted with as the promotion image. For example, the determination may be made based on promotion criteria, user preferences, user history, image information, the item(s) represented in the image, etc. As one example, the image the user interacted with may be sent a first time as part of the promotion campaign. If an image is to be sent a second time to the same user as part of the same promotion campaign, it may be determined to send a secondary image. As another example, if the user profile indicates that the user's favorite color is orange (e.g., based on other images viewed by the user), but the image the user interacted with includes a representation of a blue dress shirt, a secondary image that includes a representation of the dress shirt in orange may be selected for sending to the user as the promotion.

As still another example, if it is determined that a secondary image that includes a representation of the item represented in the image has a higher conversion or sale rate, it may be determined that the secondary image is to be utilized. Likewise, if the represented item is no longer available, an older model, out of stock, etc., it may be determined that the image previously interacted with by the user is not to be provided.

If it is determined that the image that the user previously interacted with is to be sent to the user, the image is sent for presentation to the user, as in 1606. For example, the image may be sent to an application running on a client device of the user, directly to the client device of the user, sent as a multimedia message to the user, sent as an electronic mail (e-mail) message, etc. If it is determined that the image the user previously interacted with is not to be sent to the user, a secondary image is selected and sent to the user, as in 1608. A secondary image may be sent in one or more of the same forms as an image previously interacted with by the user.

As discussed above, a user may interact with a received image to obtain more information about the image, the represented item(s), the sellers, to purchase the represented item, etc.

Figure 17:
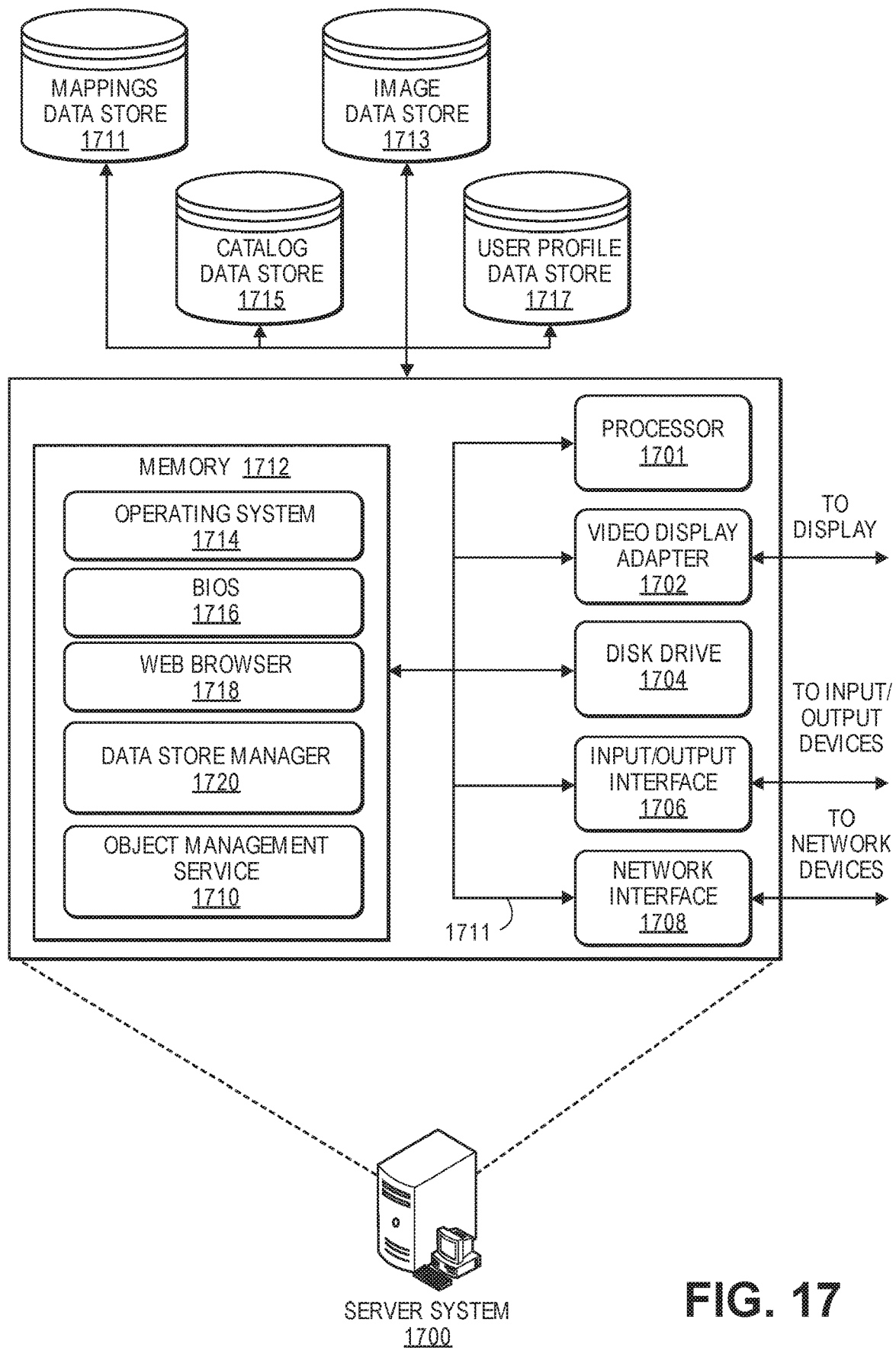
FIG. 17 is a pictorial diagram of an illustrative implementation of a server system that may be used for various implementations.

FIG. 17 is a pictorial diagram of an illustrative implementation of a server system, such as the server system 1700 that may be used in the implementations discussed herein. The server system 1700 may include a processor 1701, such as one or more redundant processors, a video display adapter 1702, a disk drive 1704, an input/output interface 1706, a network interface 1708, and a memory 1712. The processor 1701, the video display adapter 1702, the disk drive 1704, the input/output interface 1706, the network interface 1708, and the memory 1712 may be communicatively coupled to each other by a communication bus 1711.

The video display adapter 1702 provides display signals to a local display (not shown in FIG. 17) permitting an operator of the server system 1700 to monitor and configure operation of the server system 1700. The input/output interface 1706 likewise communicates with external input/output devices not shown in FIG. 17, such as a mouse, keyboard, scanner, or other input and output devices that can be operated by an operator of the server system 1700. The network interface 1708 includes hardware, software, or any combination thereof, to communicate with other computing devices. For example, the network interface 1708 may be configured to provide communications between the server system 1700 and other computing devices, such as the client device 104, via the network 108, as shown in FIG. 1.

The memory 1712 generally comprises random access memory (RAM), read-only memory (ROM), flash memory, and/or other volatile or permanent memory. The memory 1712 is shown storing an operating system 1714 for controlling the operation of the server system 1700. A binary input/output system (BIOS) 1716 for controlling the low-level operation of the server system 1700 is also stored in the memory 1712.

The memory 1712 additionally stores program code and data for providing network services that allow client devices and sellers to exchange information and data files with the server system 1700 and/or the management service 1710. Accordingly, the memory 1712 may store a browser application 1718. The browser application 1718 comprises computer executable instructions, that, when executed by the processor 1701, generate or otherwise obtain configurable markup documents such as Web pages. The browser application 1718 communicates with a data store manager application 1720 to facilitate data exchange and mapping between the mappings data store 1711, the image data store 1713, the item catalog data store 1715, and/or the user profile data store 1717, client devices, such as the client device 104 shown in FIG. 1, and/or sellers, such as the sellers 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 1700 can include any appropriate hardware and software for integrating with the data stores 1711-1717 as needed to execute aspects of one or more applications for the client device, the sellers and/or the management service 1710. The server system 1700 provides access control services in cooperation with the data stores 1711-1717 and is able to generate content such as text, graphics, audio, video and/or images to be transferred to a client device and/or sellers.

The data stores 1711-1717 can include several separate data tables, databases or other data storage mechanisms and media for storing data relating to a particular aspect. For example, the data stores 1711-1717 illustrated include mechanisms for storing images, user information, mappings and item catalogs from sellers of items, which can be used to generate and deliver content to client devices and/or sellers (e.g., user provided images and purchase controls) and control actions to be performed.

It should be understood that there can be many other aspects that may be stored in the data stores 1711-1717, such as access rights information, preferred sellers, etc., which can be stored in any of the above listed mechanisms as appropriate or in additional mechanisms of any of the data stores 1711-1717. The data stores 1711-1717 are operable, through logic associated therewith, to receive instructions from the server system 1700 and obtain, update or otherwise process data in response thereto.

The memory 1712 may also include the management service 1710, discussed above. The management service 1710 may be executable by the processor 1701 to implement one or more of the functions of the server system 1700. In one implementation, the management service 1710 may represent instructions embodied in one or more software programs stored in the memory 1712. In another implementation, the management service 1710 can represent hardware, software instructions, or a combination thereof.

The server system 1700, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction in FIG. 17 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    storing, by a management service, a user-supplied image in an image data store, wherein the user-supplied image is supplied by a first user of the management service that is distinct from a seller and is one of a plurality of stored images stored in the image data store;
    processing, by the management service, the user-supplied image using one or more image processing algorithms to determine an object represented in the user-supplied image and first image information that includes at least one of a first plurality of feature vectors or a first histogram associated with the object;
    comparing first characteristics of the object represented in the user-supplied image to second characteristics associated with a plurality of item categories to determine, by the management service, an item category from the plurality of item categories that corresponds to the object;
    comparing, by the management service, at least the first image information associated with a plurality of second image information associated with a plurality of catalog items associated with the item category to determine a catalog item from the plurality of catalog items that includes a highest similarity score with the user-supplied image based at least in part on the comparison of the first image information and the plurality of second image information, wherein each of the plurality of second image information includes at least one of a second plurality of feature vectors or a second histogram associated with a respective catalog item from the plurality of catalog items;
    determining that the highest similarity score exceeds a threshold;
    in response to the determination that the highest similarity score exceeds the threshold, storing, by the management service, an association between the user-supplied image and at least one of the catalog item or a seller information corresponding to the catalog item, wherein the seller information indicates at least a first seller of the catalog item;
    receiving, by the management service, a promotion information corresponding to the first seller, the promotion information usable by the management service to establish a promotion of the catalog item or an image of the catalog item on behalf of the first seller;
    processing each of the plurality of stored images, including the user-supplied image, to determine a second plurality of stored images corresponding to the promotion information, wherein the second plurality of stored images includes the user-supplied image;
    processing, by the management service, stored user information maintained in a user profile data store to determine a plurality of users that have interacted with at least one image of the second plurality of stored images;
    establishing a promotion campaign based at least in part on the promotion information, the second plurality of images, and the plurality of users; and
    for a second user of the plurality of users:
        determining that a time duration since the second user last interacted with the user-supplied image exceeds a defined time duration; and
        in response to determining that the time duration exceeds the defined time duration, sending for presentation to the second user and as part of the promotion campaign, at least one of the user-supplied image or a secondary image, wherein the secondary image is included in the second plurality of stored images.

2. The computer-implemented method of claim 1, further comprising:
    in response to determining that the time duration exceeds the defined time duration, sending for presentation to the second user a purchase control that may be activated by the user to initiate a purchase of the catalog item represented in at least one of the user-supplied image or the secondary image.

3. The computer-implemented method of claim 1, further comprising:
    in response to determining that the time duration exceeds the defined time duration, sending, for presentation to the second user, seller information indicating the first seller of the catalog item represented in at least one of the user-supplied image or the secondary image.

4. The computer-implemented method of claim 1, wherein at least one of the plurality of stored images is provided by a second user of the management service, wherein the second user is distinct from the seller.

5. The computer-implemented method of claim 1, wherein processing the stored user-supplied images includes:
   determining that third image information for at least one of the plurality of stored images includes a source location identifier; and
   in response to determining that the third image information for at least one of the plurality of stored images includes the source location identifier, determining that the at least one of the plurality of stored images corresponds to the promotion information.

6. The computer-implemented method of claim 1, wherein the seller information indicates a plurality of sellers of the catalog item.

7. The computer-implemented method of claim 1, wherein the time duration is varied based at least in part on at least one of the second user, the second plurality of images, or an interaction mode.

8. A non-transitory computer-readable storage medium storing instructions, the instructions, when executed by a processor, causing the processor to at least:
   store a plurality of user-supplied images in an image data store;
   receive a promotion information corresponding to a seller;
   process the plurality of user-supplied images using one or more image processing algorithms to determine a respective object represented in each of the plurality of user-supplied images;
   comparing first characteristics of the respective objects represented in each of the user-supplied images to second characteristics associated with a plurality of item categories to determine an item category from the plurality of item categories that corresponds to each respective object;
   determine a second plurality of images from the plurality of user-supplied images that includes a same item category as an item associated with the promotion information and a first plurality of image information, wherein each of the first plurality of image information includes at least one of a first plurality of feature vectors or a first histogram associated with a respective image from the second plurality of images;
   compare at least a portion of the first plurality of image information associated with at least a portion of each of the second plurality of images with second image information associated with the item associated with the promotion information to determine a third plurality of images from the second plurality of images that includes a highest similarity score indicating that the third plurality of images correspond to the item associated with the promotion information based at least in part on the comparison of the first plurality of image information and the second image information, wherein the second image information includes at least one of a second plurality of feature vectors or a second histogram associated with the item;
   determine that a highest similarity score exceeds a threshold;
   in response to the determination that the highest similarity score exceeds the threshold, store an association in a mapping data store for each of the third plurality of images and the promotion information; and
   establish a promotion campaign based at least in part on the promotion information and previous interactions of a plurality of users with at least one of the third plurality of images.

9. The non-transitory computer-readable storage medium of claim 8, the instructions, when executed by the processor, further causing the processor to at least:
   process stored user information maintained in a user profile data store to determine that the plurality of users have previously interacted with at least one image of the third plurality of images; and
   wherein the promotion campaign is targeted toward the plurality of users.

10. The non-transitory computer-readable storage medium of claim 9, wherein a determination that the plurality of users has interacted with at least one of the third plurality of images is based at least in part on one or more of the plurality of users saving at least one of the third plurality of images, the plurality of users viewing at least one of the third plurality of images, the plurality of users sharing at least one of the third plurality of images, the plurality of users forwarding at least one of the third plurality of images, a time duration the plurality of users views at least one of the third plurality of images, a user comment for at least one of the third plurality of images, a user rating of at least one of the third plurality of images, or a frequency of times the plurality of users interacts with at least one of the third plurality of images.

11. The non-transitory computer-readable storage medium of claim 8, the instructions, when executed by the processor, further causing the processor to at least:
   determine, for a second user, a time since the second user last interacted with the at least one image;
   determine that the time exceeds a time period; and
   send for presentation to the user, the at least one of the third plurality of images or a secondary image.

12. The non-transitory computer-readable storage medium of claim 11, wherein the secondary image or one of the third plurality of images, when sent for presentation to the second user, includes at least a source location identifier, such that the second user can interact with the secondary image or one of the third plurality of images and be presented with additional information about the seller.

13. The non-transitory computer-readable storage medium of claim 8, the instructions, when executed by the processor, further causing the processor to at least:
   determine, for a second user, a time since the second user last interacted with the at least one image;
   determine that the time exceeds a time period;
   determine a secondary image that corresponds to the at least one of the third plurality of images; and
   send for presentation to the user, the secondary image.

14. The non-transitory computer-readable storage medium of claim 13, wherein the secondary image is determined based on at least one of a user preference, a user image view history, a user purchase history, a similarity between the at least one of the third plurality of images and the secondary image, a first item represented in the secondary image corresponding to a second item represented in the at least one of the third plurality of images, the first item represented in the secondary image being a complementary item to the second item represented in the at least one of the third plurality of images, the first item represented in the secondary image being a substitute item for the second item represented in the at least one of the third plurality of images, or the secondary image including a representation of a third item represented in the at least one of the third plurality of images.

15. The non-transitory computer-readable storage medium of claim 13, wherein at least one of the third plurality of images is provided by a user that is distinct from the seller.

16. The non-transitory computer-readable storage medium of claim 8, wherein the promotion information further includes promotion criteria.

17. The non-transitory computer-readable storage medium of claim 16, wherein the promotion criteria specify at least one of a promotion campaign duration, a campaign price, a user profile toward which the promotion campaign is to be targeted, a device type, or a promotion campaign budget.

18. A computing system, comprising:
one or more processors; and
a memory coupled to the one or more processors and storing program instructions that when executed by the one or more processors, cause the one or more processors to perform a method comprising:
storing a user-supplied image in an image data store, wherein the user-supplied image is supplied by a first user that is distinct from a seller;
maintaining a catalog data store storing a plurality of catalog items;
processing the user-supplied image using one or more image processing algorithms to determine an object represented in the user-supplied image and first image information that includes at least one of a first plurality of feature vectors or a first histogram associated with the object;
comparing first characteristics of the object represented in the user-supplied image to second characteristics associated with a plurality of item categories to determine an item category from the plurality of item categories that corresponds to the object;
comparing the first image information associated with a plurality of second image information associated with one or more catalog items from the plurality of catalog items that are associated with the item category to determine a catalog item from the plurality of catalog items that includes a highest similarity score with the user-supplied image based at least in part on the comparison of the first image information and the plurality of second image information, wherein each of the plurality of second image information includes at least one of a second plurality of feature vectors or a second histogram associated with a respective catalog item from the one or more catalog items;
determining that the highest similarity score exceeds a first threshold;
in response to the determination that the highest similarity score exceeds the first threshold, storing an association between the user-supplied image and the catalog item in a mappings data store;
receiving a promotion information associated with the catalog item and corresponding to a first seller;
processing stored user information maintained in a user profile data store to determine a plurality of users that have previously interacted with the user-supplied image; and
for the plurality of users, sending, for presentation to the plurality of users, at least one of the user-supplied image or a secondary image.

19. The computing system of claim 18, wherein the method further comprises:
for the second user, determining that an interaction with the user-supplied image exceeds a second threshold; and
wherein sending for presentation to the user is performed in response to a determination that the interaction exceeded the second threshold.

20. The computing system of claim 19, wherein the second threshold corresponds to at least one of a time duration since the interaction, an interaction type, a frequency of interactions, or a time duration of the interaction.

21. The computing system of claim 18, wherein a source location identifier is provided by the first seller and corresponds to an electronic commerce website of the first seller.

22. The computing system of claim 18, wherein the method further comprises:
for the second user, sending for presentation to the second user and with the presentation of at least one of the user-supplied image or the secondary image, a purchase control that may be activated by the second user to initiate a purchase from the first seller of the catalog item represented in at least one of the user-supplied image or the secondary image.

* * * * *